US009477709B2

(12) United States Patent
Sharifi

(10) Patent No.: US 9,477,709 B2
(45) Date of Patent: *Oct. 25, 2016

(54) QUERY RESPONSE USING MEDIA CONSUMPTION HISTORY

(71) Applicant: Google Inc., Mountain View, CA (US)

(72) Inventor: Matthew Sharifi, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/217,940

(22) Filed: Mar. 18, 2014

(65) Prior Publication Data

US 2015/0052128 A1    Feb. 19, 2015

Related U.S. Application Data

(63) Continuation of application No. 14/047,708, filed on Oct. 7, 2013, now Pat. No. 9,002,835.

(60) Provisional application No. 61/866,234, filed on Aug. 15, 2013.

(51) Int. Cl.
*G06F 7/00* (2006.01)
*G06F 17/30* (2006.01)
*G10L 25/54* (2013.01)
*G06Q 30/06* (2012.01)
*G06Q 30/02* (2012.01)

(52) U.S. Cl.
CPC ... *G06F 17/30477* (2013.01); *G06F 17/30026* (2013.01); *G06F 17/30035* (2013.01); *G06F 17/30041* (2013.01); *G06F 17/30044* (2013.01); *G06F 17/3053* (2013.01); *G06F 17/30424* (2013.01); *G06F 17/30746* (2013.01); *G06F 17/30867* (2013.01); *G06F 17/30876* (2013.01); *G06Q 30/02* (2013.01); *G06Q 30/0631* (2013.01); *G10L 25/54* (2013.01)

(58) Field of Classification Search
None
See application file for complete search history.

(56) References Cited

U.S. PATENT DOCUMENTS

| 6,791,580 B1 * | 9/2004 | Abbott | G06F 1/163 |
| | | | 707/E17.009 |
| 7,181,444 B2 | 2/2007 | Porter et al. | |
| 7,444,353 B1 | 10/2008 | Chen et al. | |
| 7,746,895 B2 | 6/2010 | Bucher et al. | |
| 7,937,403 B2 | 5/2011 | Kehl et al. | |

(Continued)

OTHER PUBLICATIONS

Fink et al., "Social and interactive television applications based on real-time ambient-audio identification", Proceedings of the EuroITV 2006 Conference, pp. 138-146, 2006, ResearchGate.*

(Continued)

*Primary Examiner* — Michael Hicks
(74) *Attorney, Agent, or Firm* — Fish & Richardson P.C.

(57) ABSTRACT

Methods, systems, and apparatus for receiving a natural language query of a user, and environmental data, identifying a media item based on the environmental data, determining an entity type based on the natural language query, selecting an entity associated with the media item that matches the entity type, selecting, from a media consumption database that identifies media items that have been indicated as consumed by the user, one or more media items that have been indicated as consumed by the user and that are associated with the selected entity, and providing a response to the query based on selecting the one or more media items that have been indicated as consumed by the user and that are associated with the selected entity.

20 Claims, 7 Drawing Sheets

(56) References Cited

U.S. PATENT DOCUMENTS

| | | | |
|---|---|---|---|
| 8,180,765 B2 | 5/2012 | Nicolov | |
| 8,484,017 B1 | 7/2013 | Sharifi et al. | |
| 8,954,448 B1* | 2/2015 | Durham et al. | 707/748 |
| 9,110,954 B2* | 8/2015 | Shen | G06F 17/30029 |
| 2005/0071323 A1 | 3/2005 | Gabriel | |
| 2007/0192319 A1 | 8/2007 | Finley et al. | |
| 2007/0239675 A1* | 10/2007 | Ragno et al. | 707/3 |
| 2008/0183757 A1 | 7/2008 | Dorogusker et al. | |
| 2008/0222105 A1 | 9/2008 | Matheny | |
| 2008/0222295 A1 | 9/2008 | Robinson et al. | |
| 2008/0275846 A1 | 11/2008 | Almas | |
| 2009/0164641 A1 | 6/2009 | Rogers et al. | |
| 2010/0070488 A1 | 3/2010 | Sylvain | |
| 2011/0153050 A1* | 6/2011 | Bauer et al. | 700/94 |
| 2011/0276396 A1 | 11/2011 | Rathod et al. | |
| 2012/0059495 A1 | 3/2012 | Weiss et al. | |
| 2012/0166432 A1 | 6/2012 | Tseng et al. | |
| 2013/0031087 A1* | 1/2013 | Kropitz | G06F 17/3066 707/722 |
| 2013/0117259 A1 | 5/2013 | Ackerman et al. | |
| 2013/0124371 A1 | 5/2013 | Mehta et al. | |
| 2013/0173604 A1 | 7/2013 | Li et al. | |
| 2014/0032522 A1* | 1/2014 | Bhola | G06F 17/3066 707/706 |
| 2014/0101142 A1 | 4/2014 | Uribe et al. | |
| 2014/0101192 A1 | 4/2014 | Sabah et al. | |
| 2015/0052168 A1 | 2/2015 | Sharifi et al. | |
| 2015/0134334 A1* | 5/2015 | Sachidanandam | G06F 3/167 704/251 |

OTHER PUBLICATIONS

Lee, "Analysis of User Needs and Information Features in Natural Language Queries Seeking Music Information", Journal of the American Society for Information Science and Technology, 61(5), pp. 1025-1045, 2010, Wiley Interscience.*

Song et al., "Voice search of structured media data", ICASSP 2009, pp. 3941-3944, 2009, IEEE.*

Taneja et al., "Media consumption across platforms: Identifying user-defined repertoires", New Media & Society, vol. 14, No. 6, pp. 951-968, Sep. 2012, Sage Publications.*

Feng et al., "Speech and Multimodal Interaction in Mobile Search," IEEE Signal Processing Magazine, IEEE 1-21 NJ, US, Service Center, Piscataway, vol. 28, No. 4, Jul. 1, 2011 pp. 40-49.

International Search Report and Written Opinion in International Application No. PCT/US2014/051126, mailed Nov. 21, 2014, 12 pages.

International Search Report and Written Opinion in International Application No. PCT/US2014/051123, mailed Nov. 28, 2014, 11 pages.

Cano, "Content-Based Audio Search: From Fingerprinting to Semantic Audio Retrieval", Dissertation, Pompeu Fabra University, 2006.

Office Action issued in U.S. Appl. No. 14/047,708 on Dec. 18, 2013, 23 pages.

Office Action issued in U.S. Appl. No. 14/047,708 on Apr. 16, 2014, 16 pages.

Notice of Allowance issued in U.S. Appl. No. 14/047,708 on Feb. 3, 2015, 11 pages.

International Preliminary Report on Patentability in International Application No. PCT/US2014/051126, mailed Feb. 25, 2016, 8 pages.

International Preliminary Report on Patentability in International Application No. PCT/US2014/051123, mailed Feb. 25, 2016, 8 pages.

* cited by examiner

QUERY RESPONSE USING MEDIA CONSUMPTION HISTORY

CROSS-REFERENCE TO RELATED APPLICATION

This patent application is a continuation (and claims the benefit of priority under 35 USC 120) of U.S. patent application Ser. No. 14/047,708, filed Oct. 7, 2013, which claims the benefit of U.S. Provisional Application Ser. No. 61/866,234, filed on Aug. 15, 2013, which is incorporated by reference.

TECHNICAL FIELD

This specification relates to processing search queries.

BACKGROUND

In general, a user can request information by inputting a query, such as a query input at a search engine or at a client device associated with the user. The query can be processed, for example by the search engine or the client device, and information can be output to the user in response to the query.

SUMMARY

A system can identify content consumed by a user, as well as entities, e.g., actors, musicians, writers, directors, television networks, production companies, etc., associated with the consumed content. In response to receiving a query that identifies a content item or entity, the system can provide information identifying specific content consumed by the user or entities associated with the content consumed by the user that are related to the item or entity identified by the query. For example, a user can provide a query that identifies "Justin Timberlake" to a search engine, and the search engine can provide a response to the query that includes information about "Justin Timberlake," as well as information relating to media that the user has consumed that features "Justin Timberlake." For example, the response may include information about "Justin Timberlake" such as his age, height, occupation, etc., as well as information about content that the user has consumed that features "Justin Timberlake," such as a movie that the user has seen that features "Justin Timberlake" or a concert that the user has attended that featured "Justin Timberlake."

The server-based computing environment receives indications of content consumed by the user from various sources and stores information identifying the content and entities related to the content in a media consumption history. In some applications, the server-based system additionally receives and stores information describing the user's consumption of the content. For example, the system can determine that the user viewed the movie "The Social Network" featuring "Justin Timberlake" on a particular date and at a particular location. The system can store the information at the media consumption history that identifies the particular date and the particular location where the user viewed the movie "The Social Network," and can subsequently receive a request that identifies the user and "Justin Timberlake." The system can provide a response to the request that includes information about "Justin Timberlake" and can also indicate that the user viewed the movie "The Social Network" that features "Justin Timberlake" on the particular date and at the particular location.

In some applications, information from the media consumption history can be provided to the user in response to queries input at a search engine or an application operating on a user's device, in response to detecting a user's exposure to certain content, in response to determining that the user is located in a particular geographic location, or based on detecting other events. For example, a user can input a natural language query at a device, such as the spoken query, "When have I seen this actor before?" while viewing particular content, such as the movie "The Social Network." The spoken query and environmental data obtained from the environment of the user, such as ambient audio or video data from the environment of the user, can be obtained by the user's device and transmitted to the server-based system. The system can determine, based on the environmental data, that the user is viewing the movie "The Social Network," and can further determine that the user would like to know a time when the user has seen the actor "Justin Timberlake," based on analyzing the spoken query and the environmental data. For example, the term "actor" can be identified from the spoken query, causing the system to identify an actor corresponding to the particular segment of "The Social Network" included in the environmental data, such as the actor "Justin Timberlake." Furthermore, based on identifying the term "when" from the spoken query, the system can access the media consumption history associated with the user, and a response to the query can be provided that identifies times when the user has viewed other movies that feature "Justin Timberlake" as an actor, e.g., a date and time when the user viewed the movie "In Time" featuring "Justin Timberlake."

Innovative aspects of the subject matter described in this specification may be embodied in methods that include the actions of receiving a request that includes a user identifier of a user that submitted a search query, and an entity identifier of an entity that is associated with one or more query terms of the search query, determining that the entity that is associated with the one or more query terms of the search query is identified, in a media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database, and providing a response to the request, based on the determination that the entity that is associated with the one or more query terms of the search query is identified, in the media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database.

Other embodiments of these aspects include corresponding systems, apparatus, and computer programs, configured to perform the actions of the methods, encoded on computer storage devices.

These and other embodiments may each optionally include one or more of the following features. In various examples, the response to the request includes at least data indicating that the entity that is associated with the one or more query terms of the search query is identified, in the media consumption database that identifies one or more media items that have been indicated as consumed by the user, as a media item that has been indicated as consumed by the user or that the entity that is associated with the one or more query terms of the search query is associated with a media item that has been indicated as consumed by the user in the media consumption database; the response to the request includes at least data indicating either that the entity that is associated with the one or more query terms of the search query is identified, in the media consumption database that identifies one or more media items that have been indicated as consumed by the user, as a media item that has been indicated as consumed by the user, or indicating that the entity that is associated with the one or more query terms of the search query is associated with a media item that has been indicated as consumed by the user in the media consumption database; determining that the entity that is associated with the one or more query terms of the search query is identified, in the media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database further comprises identifying the media item that has been indicated as consumed by the user in the media consumption database, and wherein providing the response to the request further comprises providing a response to the request that includes at least data that identifies the media item that has been indicated as consumed by the user in the media consumption database; receiving a request that includes a user identifier of a user that submitted a search query and an entity identifier of an entity that is associated with one or more query terms of the search query further comprises receiving one or more query terms of the search query, determining, based on the one or more query terms, an entity associated with the one or more query terms, and identifying the entity identifier associated with the entity; the media consumption database that identifies one or more media items that have been indicated as consumed by the user identifies a time when the media item was consumed by the user, and wherein providing a response to the request comprises providing a response to the request that includes data indicating the time when the media item was consumed by the user; the media consumption database that identifies one or more media items that have been indicated as consumed by the user identifies a location where the media item was consumed by the user, and wherein providing a response to the request comprises providing a response to the request that includes data indicating the location when the media item was consumed by the user.

Innovative aspects of the subject matter described in this specification may be embodied in methods that include the actions of receiving a natural language query of a user, and environmental data, identifying a media item based on the environmental data, determining an entity type based on the natural language query, selecting an entity associated with the media item that matches the entity type, selecting, from a media consumption database that identifies media items that have been indicated as consumed by the user, one or more media items that have been indicated as consumed by the user and that are associated with the selected entity, and providing a response to the query based on selecting the one or more media items that have been indicated as consumed by the user and that are associated with the selected entity.

Other embodiments of these aspects include corresponding systems, apparatus, and computer programs, configured to perform the actions of the methods, encoded on computer storage devices.

These and other embodiments may each optionally include one or more of the following features. In various examples, identifying the media item based on the environmental data further comprises obtaining audio fingerprints of the environmental data, comparing the audio fingerprints of the environmental data to audio fingerprints of candidate media items, and identifying, from among the candidate media items, a media item that corresponds to the environmental data, based on determining that the audio fingerprints of the environmental data match the audio fingerprints of the media item; wherein determining the entity type based on the natural language query further comprises obtaining a transcription of the natural language query, comparing text associated with the transcription of the natural language query of the user to one or more keyword phrases that are associated with entity types, and selecting an entity type, based on determining that the text associated with the transcription of the natural language query of the user matches a particular keyword phrase associated with the selected entity type; selecting the entity associated with the media item that matches the entity type further comprises obtaining audio fingerprints of the environmental data, comparing the audio fingerprints of the environmental data to audio fingerprints of the media item, the audio fingerprints of the media item being associated with timestamps corresponding to segments of the media item, identifying a timestamp corresponding to a particular segment of the media item, identifying an entity associated with the timestamp corresponding to the particular segment of the media item, the identified entity corresponding to the determined entity type, and selecting the identified entity as the entity associated with the media item; the media consumption database identifies characteristics associated with the consumption of the media items that have been indicated as consumed by the user, further comprising identifying, based on the natural language query of the user, a particular characteristic associated with the consumption of the media items that have been indicated as consumed by the user, identifying, from the media consumption database and for one or more of the media items that have been indicated as consumed by the user and that are associated with the selected entity, attributes corresponding to the particular identified characteristic, and providing information identifying the attributes corresponding to the particular identified characteristic; providing the response to the query further comprises providing a response to the query that includes information identifying one or more of the media items that have been indicated as consumed by the user and that are associated with the selected entity; wherein providing the response to the query further comprises providing a response to the query that indicates whether the media consumption database identifies one or more media items that have been indicated as consumed by the user and that are associated with the selected entity. The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a media consumption history that identifies content items that have been indicated as consumed by a user. The media consumption history can be accessed to provide information associated with the content items consumed by the user, as well as information associated with the user's consumption of the content items. In a particular application that uses the media consumption history, a user provides a query relating to content that is playing in the environment of the user. For example, the user can be viewing a movie, and can speak the question, "When have I seen this actor before?" at a client device. Audio or video data from the environment of the user can be obtained and used to identify the movie that the user is viewing as well as the actor that the user's query was likely referencing. Information can be provided in response to the user's query that indicates locations and times when the user has viewed other content featuring the identified actor, based on the media consumption history identifying other content items that have been indicated as consumed by the user and that feature the actor.

Figure 5:
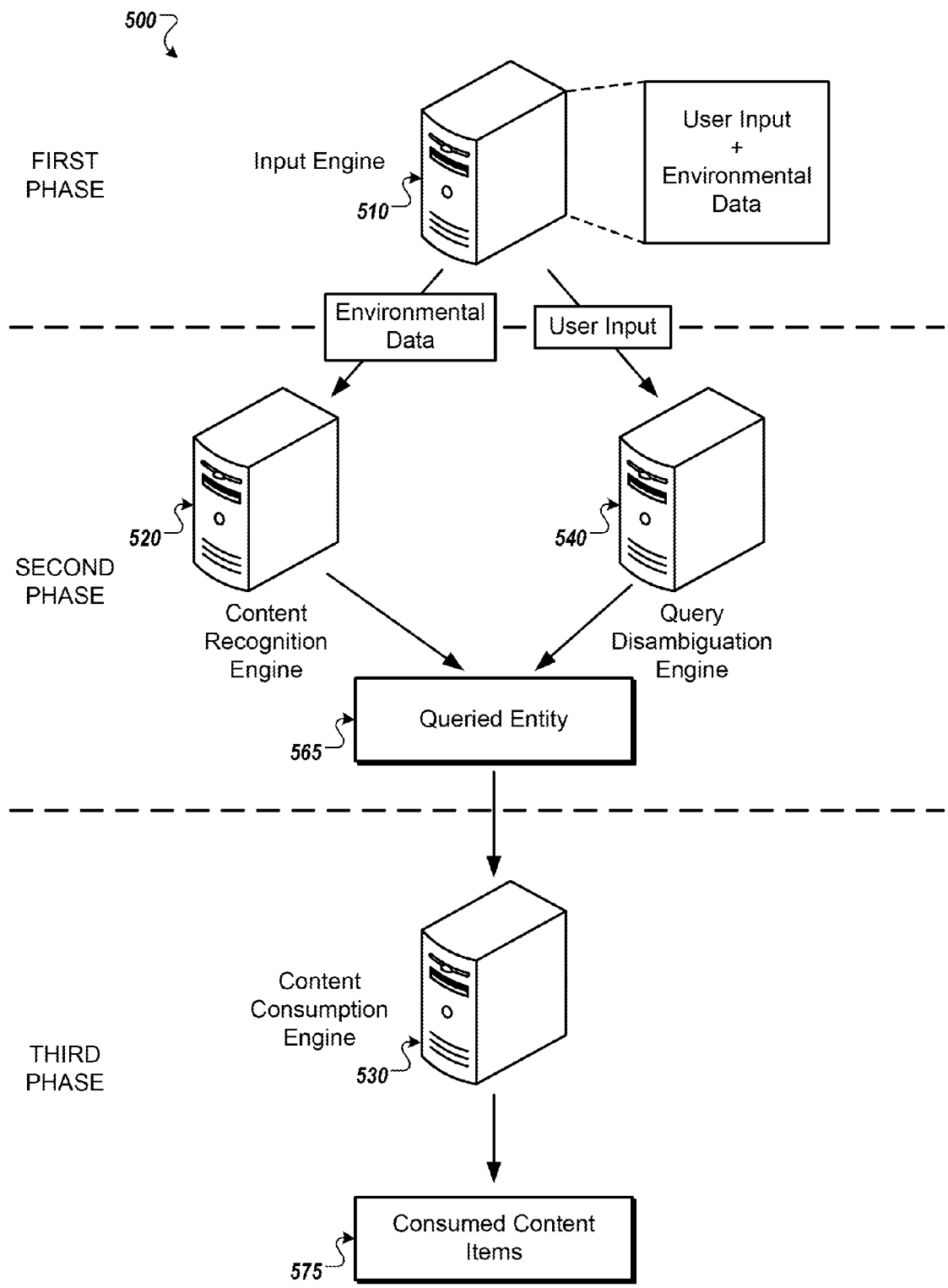
FIG. 5 depicts an example process for responding to queries based on a media consumption history.
Figure 6:
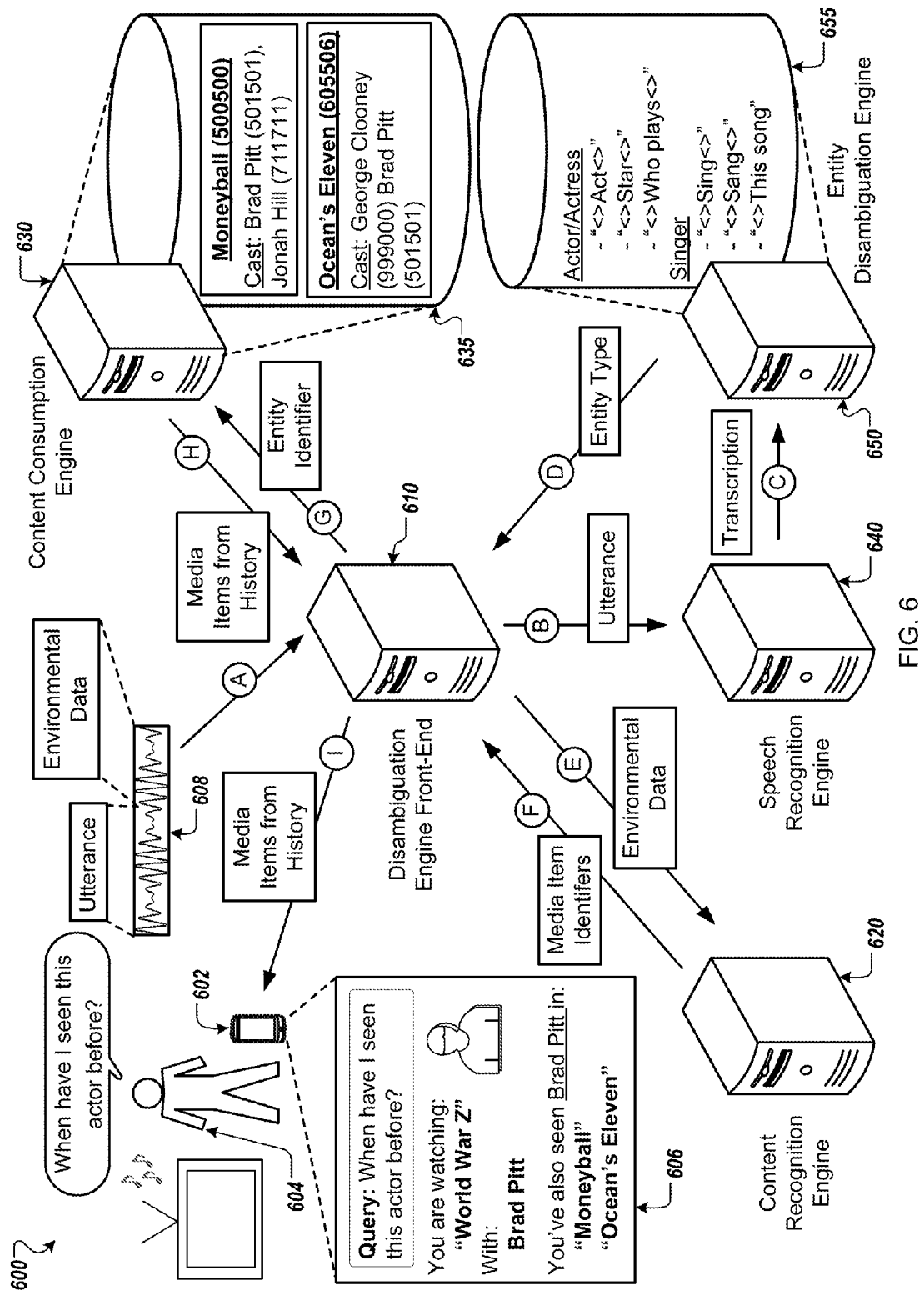
FIG. 6 depicts an example system for responding to queries based on a media consumption history.
Figure 7:
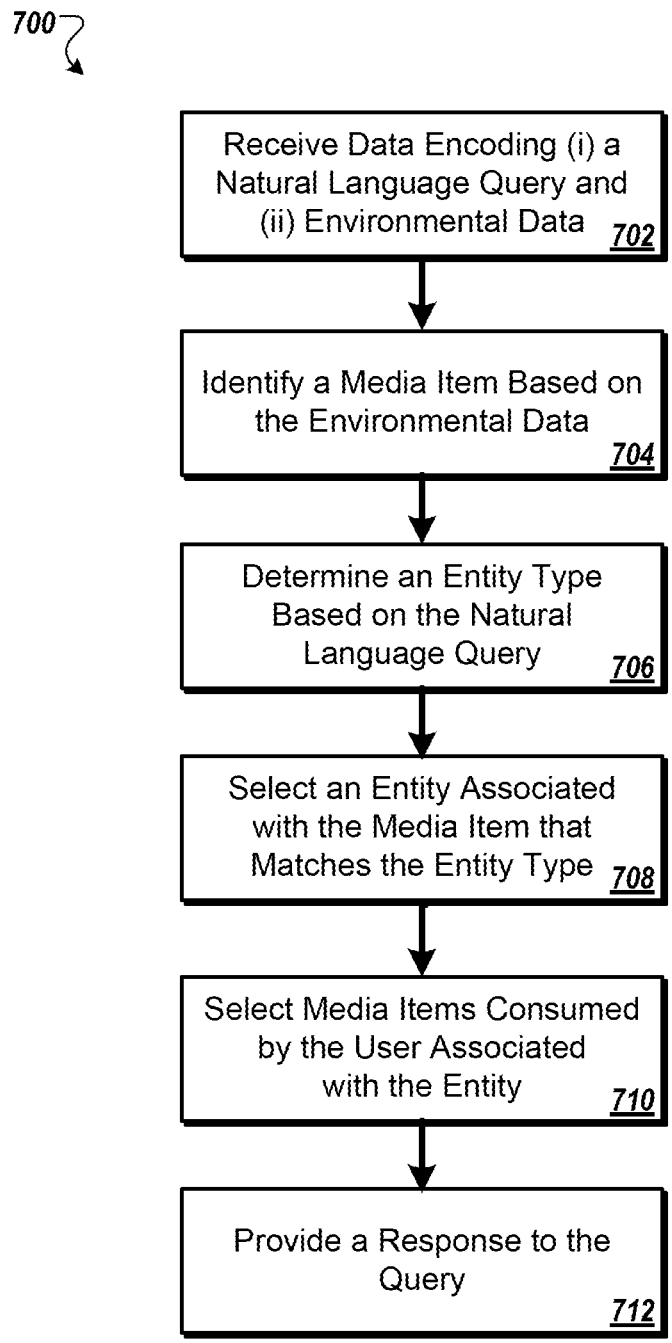
FIG. 7 depicts a flowchart of an example process for responding to queries based on a media consumption history.

In the following discussion, FIGS. 1-4 describe methods for creating a media consumption history that identifies content that has been indicated as consumed by the user, and a method of accessing the media consumption history to respond to requests for information. FIGS. 5-7 then describe a particular application that utilizes the media consumption history to respond to queries that are input by users.

Figure 1:
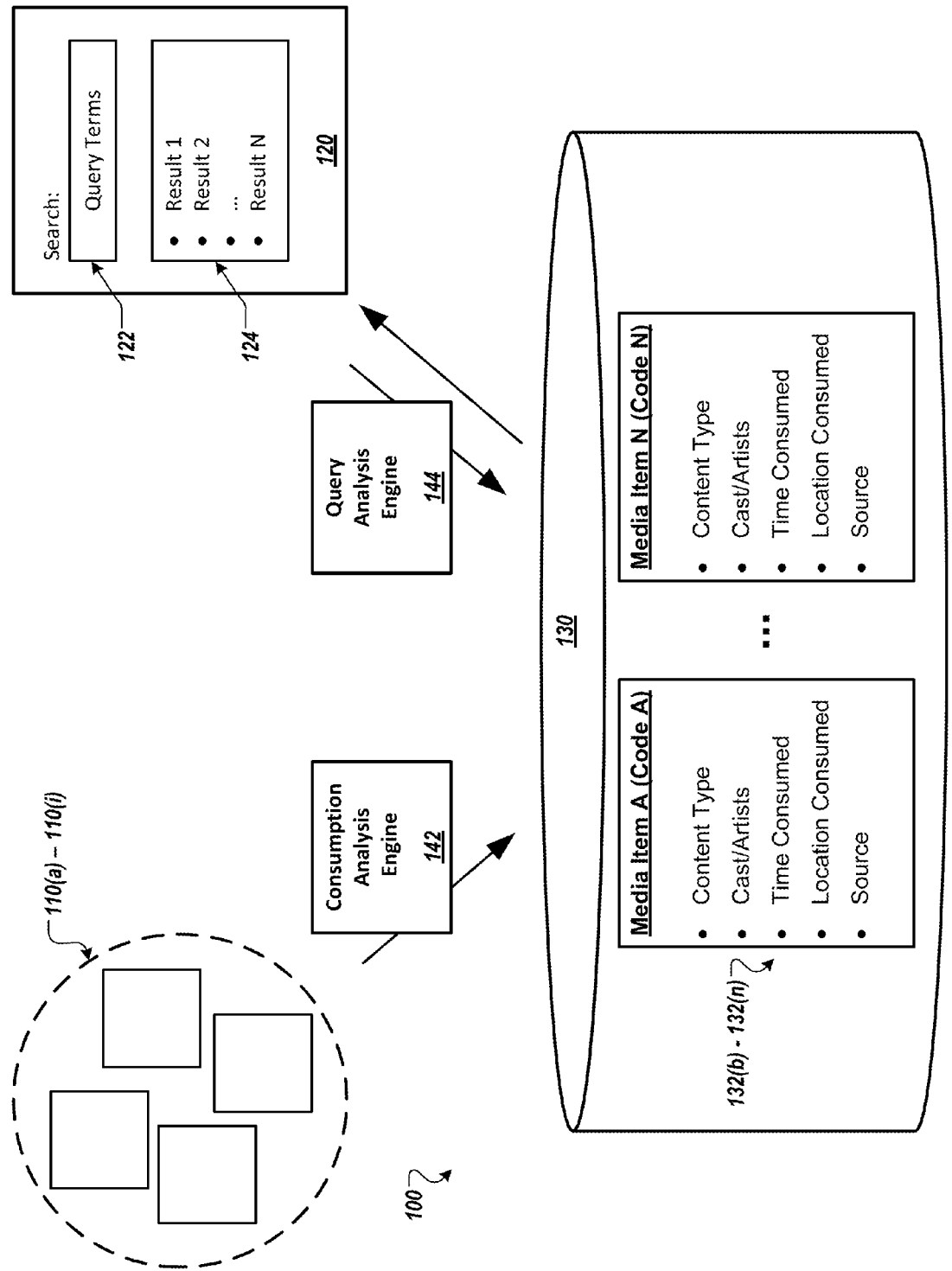
FIG. 1 depicts an example system for responding to requests based on a media consumption history.

FIG. 1 depicts a system 100 for responding to queries based on a media consumption history for a user. As used in this specification, a query can be any request for information provided to the system 100, such as a query input at a search engine or a personal assistant application.

Briefly, the system 100 can receive indications that identify content that a user has consumed and information associated with the user's consumption of the content. The system 100 can store information identifying the content, one or more entities associated with the content, and information associated with the user's consumption of the content.

A request for information can be received that identifies the user and a particular content item or entity associated with a content item, such as a search query in which one or more terms of the query identify a content item or entity. In response to the request, the user's consumption history can be accessed and one or more content items or entities can be identified that relate to the content item or entity specified by the request. The response to the request can then include information relating to or identifying the content consumed by the user and/or entities associated with the consumed content that are related to the content or entity specified by the request.

As used in this specification, content can be identified as consumed by the user based on the user likely having viewed the content, listened to the content, read the content, or otherwise been exposed to the content or a segment of the content. Therefore, a content item can be categorized as having been consumed by the user based on accessing data indicating that the user is reasonably likely to have consumed the particular content item. Content can include content items such as one or more movies, television shows, songs, albums, concerts, plays, recorded interviews, videos, books, magazines, newspapers, websites, or other web-based, audio, video, text, or mixed media content. Additionally, one or more entities may be associated with a content item, for example, one or more actors, directors, writers, singers, musicians, artists, photographers, editors, bands, record labels, production companies, television networks, radio networks or stations, companies, products, songs, soundtracks, etc. In some instances, a content item may be referred to as an entity, e.g., a movie, television show, song, etc., or an entity associated with a content item may be a content item in its own right, e.g., a soundtrack to a movie may constitute both a content item and an entity associated with the movie. The system 100 can include one or more content consumption sources 110(*a*)-110(*i*), a query engine 120, a content consumption engine 130, a consumption analysis engine 142, and a query analysis engine 144.

In further detail, the one or more content consumption sources 110(*a*)-110(*i*) are in communication with the content consumption engine 130 over one or more networks, such as one or more local area networks (LAN), or wide area networks (WAN), such as the Internet. The content consumption engine 130 can receive data from the one or more content consumption sources 110(*a*)-110(*i*) indicating content consumed by a user as well as information associated with the user's consumption of the content, such as a time and place where the user consumed the content.

Data can be stored at a media consumption history database associated with the content consumption engine 130, where the data identifies the content consumed by the user and information associated with both the user's consumption of the content, e.g., when and where the user consumed the content, and the content itself, e.g., one or more entities associated with the content. For example, the consumption analysis engine 142 can identify a cast list associated with a movie that the user is identified as having viewed, and the content consumption engine 130 can store information identifying the movie, the user, a time and place where the user watched the movie, and information identifying the cast members of the movie.

The query engine 120 can be in communication with the content consumption engine 130 over one or more networks such that the content consumption engine 130 can receive and respond to requests for information from the query engine 120. Requests received from the query engine 120 can identify a user and can be analyzed by the query analysis engine 144 to identify a particular content item or entity associated with the request. Content corresponding to the particular content item or entity identified by the query analysis engine 144 can then be identified at the content consumption engine 130. For example, based on determining that a query mentions the figure "Justin Timberlake," content items consumed that feature "Justin Timberlake" can be identified, e.g., content in which "Justin Timberlake" has acted, sang, directed, produced, etc.

A response to the request provided to the query engine 120 can identify content featuring "Justin Timberlake" that the user has consumed, and can also identify additional information associated with the user's consumption of the content, e.g., when and where the user consumed the content. The response to the request can also include information pertaining to the content or entity identified from the query, as well as the information pertaining to the content that has been consumed by the user. For example, the response to the query can include a biography relating to the figure "Justin Timberlake," and a synopsis for a movie that the user has watched that features "Justin Timberlake." Information pertaining to content that has been consumed by the user or entities associated with the consumed content can be accessed at a system that is external to the system 100, for example, by accessing content that is available on the Internet over one or more networks.

Content that a user consumes can be identified by one or more sources 110(*a*)-110(*i*). According to some implementations of the described subject matter, the content consumption sources 110(*a*)-110(*i*) can include any source that is capable of receiving information that indicates particular content that has been consumed by a user, or can include sources that are capable of determining content that has been consumed by the user. In some implementations, the content consumption sources 110(*a*)-110(*i*) can use application program interfaces (API) to identify content that has been consumed by a user. In some examples, the content consumption sources 110(*a*)-110(*i*) can be any application, server, or other system capable of receiving or accessing information identifying content consumed by a user. In some implementations, the application, server, or system can identify content consumed by the user based on accessing other information associated with the user, such as financial information associated with the user or a social network profile associated with the user. In still other implementations, the content consumption sources 110(*a*)-110(*i*) can include sources of information, e.g., email, social networks, etc., that can be accessed to determine the content consumed by a user.

For example, content consumption sources 110(*a*)-110(*i*) can include sources that provide proofs of purchase of a content item. A proof of purchase may include a receipt, such as an electronic receipt received at an email address of a user, or a transaction documented by the user, e.g., using a personal finance application. A charge applied to a credit card, debit card, gift card, or other payment account associated with the user may also be used to determine that a user has consumed certain content. For example, a charge billed to a credit card can indicate that the user has likely purchased or rented a particular movie, or a purchase using a payment account, e.g., PayPal, can indicate that the user has likely purchased or rented the movie. Such payment information may indicate sufficient likelihood of the user having consumed the particular content, and the particular content associated with the payment can be categorized as having been consumed by the user. Similarly, a purchase history associated with the user can be used to determine that the user has consumed particular content. For example, purchases and/or rentals from an online store or cable network service, e.g., Google Play, Apple iTunes, Pay Per View, Comcast OnDemand, etc., can indicate that a user has consumed the particular content. In some instances, proofs of purchase associated with particular events, e.g., concert tickets purchased by a user, can indicate content that has been consumed by the user.

The content consumption sources 110(*a*)-110(*i*) may also include sources that identify a content consumption history of the user. For example, a web history associated with the user, e.g., a browser history associated with a computing device of the user, can indicate content consumed by the user. Such web content can include video or audio content consumed by the user, e.g., that the user has viewed at a website such as YouTube, Hulu, or another source, can include magazines, newspapers, or other content containing text, e.g., magazine and newspaper articles that a user has accessed using the browser, radio or other audio content consumed by the user, e.g., that the user has listened to via an Internet radio source such as Pandora Internet Radio, or can include any other content that a user can consume at a device that can access the Internet. In some instances, a user's consumption history can include content that a user has accessed using other applications or media sources, such as a cable television viewing history that indicates content the user has played or viewed through their cable television service, or content that has been downloaded and/or streamed by the user using a third party service, e.g., a Netflix or Spotify history for the user.

In some implementations, the content consumption sources 110(*a*)-110(*i*) can include sources associated with actions performed by a user or requests input by a user, e.g., at one or more client devices associated with a user. For example, a user can request that a particular song, movie, or other content be identified using a content recognition application, and based on a particular content item being identified by the application, the content item may be identified as content that has been consumed by the user. In some implementations, a request input by a user and relating to a particular content item can be interpreted as correlating to the user having consumed the content. For example, a query input at a search engine that requests times that a particular movie will be shown at a movie theatre can cause the system 100 to determine that the user watched the particular movie on the day that the user input the query and at a location corresponding to the movie theatre.

The content consumption sources 110(*a*)-110(*i*) can include sources that identify a user's interactions with one or more social networks, where such interactions may indicate or be used in determining content that has been consumed by a user. For example, a user may post a message to a social network, e.g., at a profile or message board associated with the social network, that identifies content that that the user has consumed or is consuming. In some instances, determining particular content and one or more users who are consuming the content can involve parsing text associated with a message, post, caption, or other textual content available on the social network. For example, a user may post a message to a social network that recites, "Going to see 'The Social Network' with Bob at The Senator Theater at 9:00 tonight!" Based on parsing the text of the post, the system 100 may identify content, e.g., the movie called "The Social Network," one or more users, e.g., the user who posted the message and the user identified as "Bob," a location associated with the users consuming the content, e.g., a location corresponding to "The Senator Theater," and a time and date when the content is consumed, e.g., 9:00 PM on the particular day of the post.

In addition to parsing text associated with interactions performed at a social network, such as messages, posts, and captions, other social network interactions may be used to identify content that has been consumed by a user. In some implementations, content can be identified as consumed by the user based on the user providing an endorsement for the content at a social network, e.g., by providing a "+1" for the content, as used by Google-F, or a "Like" for the content, as used by Facebook and other social networks. In some instances, images, videos, or other content posted by a user and identifying a particular content item can be treated as an indication of the user consuming the particular content, e.g., on the particular day and at the particular location from where the image, video, or other content was posted. In some instances, interactions posted to the social network such as comments, posts, messages, captions, images, videos, or other interactions that mention and/or tag multiple users may indicate that the particular content associated with the interaction was consumed by both the user posting the interaction as well as the one or more other users mentioned or tagged in association with the interaction. In some instances, "check-ins" or other indications of a user's location can be used to determine content consumed by a user, the "check-in" or other indication also identifying a time and a location associated with the user consuming the content.

Identifying a location associated with a user's consumption of a content item can include identifying a geographic location associated with the consumption of the content and/or a name of a location associated with the consumption of the content. For example, consumption of content by a user can be associated with a particular geographical location, such as a set of coordinates, e.g., latitude and longitude or other global positioning system (GPS) coordinates, can be associated with a particular distance from a present location or from a home location, can be associated with a particular city, state, zip code, area code, county, region, or country, or can be otherwise by identified by a geographical location. In some implementations, a location can be identified by the name of a business or a type of business, e.g., "The Senator Theater" or "movie theatre," can be identified by an event that is taking place at a particular location at a particular time, e.g., at a location corresponding to the "Maryland State Fair," can be identified by a street address, by a name assigned to a particular location by a user, e.g., a location identified as a user's place of employment or home, or can be identified in another way.

Identifying a time associated with a user's consumption of a content item can include identifying a particular date, day, or time, e.g., hour of the day, when the user consumed the identified content. In some implementations, a time associated with a user's consumption of particular content is based on a time that the content consumption sources 110(a)-110(i), the consumption analysis engine 142, or the content consumption engine 130 receive data indicating that the particular content has been consumed by the user. In other implementations, a time associated with a user consuming particular content may be determined based on information received, e.g., at the content consumption sources 110(a)-110(i), that indicates a time that the content was consumed by the user. For example, information indicating that a user rented the movie "The Social Network" at 8:00 PM on Thursday, Jul. 4, 2013 can be received at a content consumption source 110(a)-110(i), content analysis engine 142, or content consumption engine 130 at 12:00 PM on Friday, Jul. 5, 2013. Based on the information received, the time that it was received by the system 100, and the implementation utilized, the time associated with the user watching the movie "The Social Network" may be identified as 8:00 PM on Thursday, Jul. 4, 2013, 12:00 PM on Friday, Jul. 5, 2013, or some subset of these dates, days, and times, e.g., Jul. 4, 2013 or Friday, Jul. 5, 2013.

Additional information may be received by the one or more content consumption sources 110(a)-110(i) related to the consumption of content by users. For example, additional information may include information pertaining to the content item, such as a file type of the content item, e.g., MP4, WAV, JPEG, HTML, etc., a file size or playback length associated with the content item, e.g., 100 Megabytes or 10 minutes in length, a quality or compression resolution associated with the file type, e.g., 1080p or 256 kbps, or other information pertaining to the content item as it was consumed by the user, e.g., whether the content item was black and white content, color content, content that was shown in high definition or standard definition, etc. In some implementations, a device used to access the content can be identified. For example, a particular content item may be a music album, and the content consumption sources 110(a)-110(i) can determine that the user has listened to the music album using a particular mobile phone, smartphone, laptop or desktop computer, tablet computer, MP3 player, wearable computing device, or other computing device.

Information received by the one or more content consumption sources 110(a)-110(i) may further indicate the exact source or event that resulted in particular content being identified as consumed by a user. For instance, information received at a source 110(a)-110(i) can indicate particular content consumed by a user and a location and/or time that the content was consumed by the user, and can further indicate an event or a source of the indication that resulted in the content be identified as consumed by the user. As an example, data received can identify a particular movie that a user has viewed, a time and location where the user viewed the movie, and can further indicate that the movie was identified as having been watched by the user based on an email received at an email address associated with the user indicating that the user has purchased a movie ticket to attend the movie.

In some implementations, identifying content that has been consumed by a user can further include identifying or estimating particular segments of the content that have been consumed by the user. In some implementations, identifying content using audio recognition can involve identifying timestamps of the content that correspond to segments of the content that were identified and/or the segments of the content to which the user was exposed. For example, in response to a user requesting audio recognition of content, a content consumption source 110(a)-110(i) associated with the request may receive data identifying a content item and further identifying a segment of the content item that was analyzed to identify the content, e.g., a 30 second segment of the content upon which audio recognition was performed to identify the content.

In some implementations, information identified by one or more content consumption sources 110(a)-110(i) can be supplemented by other information accessed by the system 100 to determine content consumed by a user. For instance, information received may identify content consumed by a user as well as a location and/or time when the user consumed the content, and the consumption analysis engine 142 can access additional information associated with the content, the location, or the time.

In some implementations, the consumption analysis engine 142 may be an application hosted on one or more computers, may be associated with a server, or may be another system capable of accessing information relevant to identified content and/or a location or time when a user consumed the identified content. In some examples, the consumption analysis engine 142 may be a separate component from both the content consumption sources 110(a)-110(i) and the content consumption engine 130, or can be integrated with the content consumption sources 110(a)-110(i) and/or content consumption engine 130. The consumption analysis engine 142 may be capable of exchanging electronic communications over one or more networks, for example, to exchange electronic communications with the content consumption sources 110(a)-110(i) and the content consumption engine 130, or to access information that is available external to the system 100, e.g., to access information that is available on the Internet. In some implementations, the consumption analysis engine 142 receives information identifying content that a user has consumed and/or a location or time associated with the user's consumption of the content. The consumption analysis engine 142 can analyze the information and/or access additional information associated with the content, the location, and/or the time.

In some instances, the consumption analysis engine 142 can receive an indication identifying content that has been consumed by a user, and one or more content items associated with the identified content can be identified and classified as having been consumed by the user. For example, based on determining that a user has watched a certain movie, a determination can also be made that the user consumed content corresponding to the soundtrack of the movie. In some implementations, the one or more related content items can be identified based on the information obtained by the one or more sources 110(a)-110(i), e.g., that identifies the soundtrack of the movie, or can be based on information obtained from another resource that is accessible by the consumption analysis engine 142, e.g., at a database that identifies the soundtracks of movies.

Identifying related content that has been consumed by a user can, in some implementations, be determined based on the source used to determine that the content was consumed by the user. As an example, if an audio recognition request is provided by a user and the audio recognition engine identifies the content as being a part of "The Phantom of the Opera" soundtrack, the consumption analysis engine 142 may determine that the user likely consumed both "The Phantom of the Opera" soundtrack as well as the Broadway production of "The Phantom of the Opera," e.g., that the user provided the audio recognition request while attending a performance of "The Phantom of the Opera." However, if a determination is made that the user has consumed "The Phantom of the Opera" soundtrack based on purchase history data, e.g., data received at a content consumption source 110(a)-110(i) indicating that the user purchased "The Phantom of the Opera" soundtrack at an online music store, then the consumption analysis engine 142 may determine that the user has not likely consumed both the soundtrack and the live performance of "The Phantom of the Opera."

The location and/or time associated with a user's consumption of content may also be considered when determining other content related to the content that the user is likely to have consumed. For instance, based on receiving information indicating that the user has performed an audio recognition to identify "The Phantom of the Opera" soundtrack while at a location corresponding to a theatre, the consumption analysis engine 142 may determine that the user has likely consumed both "The Phantom of the Opera" soundtrack as well as the live performance of "The Phantom of the Opera." However, based on receiving information indicating that the user has performed an audio recognition to identify "The Phantom of the Opera" soundtrack while at a location corresponding to the user's place of employment, a determination may be made that the user has likely only consumed "The Phantom of the Opera" soundtrack, and is not likely to have viewed the live performance of "The Phantom of the Opera."

In some instances, the consumption analysis engine 142 can receive information identifying a time and location where a user was located, and can identify content that the user likely consumed while at the particular location during the identified time. In some instances, the content can be identified by accessing information, e.g., over one or more networks, that indicates content that is likely to be available at the location during the specified time. For example, based on a social network "check-in" indicating that a user was located at "Radio City Music Hall" on a particular date, the consumption analysis engine 142 may access information to determine content that the user likely consumed while located at "Radio City Music Hall" on the particular date.

Additional information relating to content consumed by a user can be identified. In some implementations, the additional information can be identified by the consumption analysis engine 142. The additional information can be identified by accessing information that is available over one or more networks, such as by accessing information available on the Internet or at a database or server that is accessible over the one or more networks. In some instances, the additional information relating to the consumed content can be maintained and accessed at the system 100, for example, at the content consumption engine 130.

In some implementations, supplemental information accessed by the consumption analysis engine 142 that relates to particular content can include information relating to the particular content. For example, additional information relating to an identified content item can include a content type for the content item, e.g., a general content type for the content item that indicates whether the content is a video, audio, image, or text, or a specific content type for the content item that indicates whether the content is a television show, podcast, audio book, movie, concert, newspaper, magazine, etc. Information relating to an identified content item can also include information associated with the production of the content, such as a year that the content was produced, a location where it was produced, a producer of the content, etc.

Supplemental information accessed by the consumption analysis engine 142 can further identify one or more entities that are associated with the content. For example, information relating to an identified content item can include information identifying one or more people associated with the content item, e.g., a cast list for the content item, a director or producer of the content item, individuals' voices that appear in the content item, writers or editors associated with the content item, etc. In some implementations, identifying one or more people associated with a content item includes identifying the role of the one or more people with respect to the content item, e.g., a character played by an actor in a movie.

In some implementations, identifying one or more entities that are associated with the content can further include identifying one or more content items that are relevant to the content consumed by the user. For example, based on receiving information indicating that a user has viewed a particular movie, one or more other movies or other content items can be identified that are relevant to the particular movie, e.g., one or more movies or television programs that feature actors from the identified movie. According to another example, one or more content items that are relevant to the movie viewed by the user may be movies or other content items that are relevant to the identified movie in other ways, e.g., based on the other movies being nominated for an award that was the same as the identified movie, based on the movies being directed or produced by a common person, etc.

Based on identifying particular content consumed by a user, one or more other users that are relevant to the identified content may also be determined. For instance, based on receiving an indication that a user consumed particular content while at a certain location and/or at a certain time, one or more other users that are relevant to the consumption of the content by the user may be identified. In some examples, users that are relevant to the consumption of the content by the user may be one or more users that are indicated as being with the user at the time the content was consumed. For example, a post at a social network profile of the user may identify a content item, e.g., a movie, as well as one or more other users, e.g., other people that the user was with while viewing the movie.

Determining one or more other users associated with a particular content item may also be determined based on the locations of one or more other users at the time the user consumed the particular content. For instance, based on identifying content that the user consumed while located at "Radio City Music Hall," one or more other users can be identified as related to the particular content based on determining that the other users were also at "Radio City Music Hall" at a similar time. In other examples, one or more other users that are relevant to the identified content may be other users that have also consumed the identified content. For example, based on receiving an indication that a user has viewed the movie "The Social Network," one or more other users can be identified that have also been identified as having viewed the movie "The Social Network," e.g., based on information accessed at social network profiles of the one or more other users, based on accessing information at the system 100 indicating other users that have been identified as having viewed the movie, etc.

In some instances, additional analysis may be performed relating to content consumed by a user, a location that the user consumed the content, and/or a time when the content was consumed by the user. In some instances, the consumption analysis engine 142 can perform such analysis based on receiving information from one or more content consumption sources 110(a)-110(i) indicating content that has been consumed by a user at a particular time and/or location. In some instances, the analysis can also consider additional information received at the consumption analysis engine 142, e.g., one or more timestamps associated with the user recognizing or viewing the content, a device used by the user to consume the content, a source of the indication that the user has consumed the content, etc.

In some instances, timestamps or other information relating to a user's consumption of content can be identified and used to determine or estimate a segment of the content item consumed by the user. Additional information regarding the content item can be identified based on the segment of the content that is identified as having been consumed by the user. For instance, a movie that the user has watched may be identified based on cable television history data, e.g., data that identifies digital cable television content that the user has watched, and the cable television history data may be used to determine that the user watched a specific segment of the movie and not the entire movie. In another example, timestamps detected based on an audio recognition process can be used to determine a segment of a movie that a user has likely watched, e.g., at least a one hour segment of the movie that includes the segments of the movie corresponding to the identified timestamps. Based on determining the specific segment of the movie watched by the user, information can be accessed that is relevant to the specific segment of the movie, e.g., a partial cast list that is relevant only to the segment of the movie watched by the user, a segment of a soundtrack that is played during the segment of the movie, or other entities associated with the segment of the movie.

In some implementations, identifying a segment or extent to which a user has consumed particular content can allow the content to be categorized as content that has been fully consumed, partially consumed, or unconsumed by the user. For instance, based on cable television history data indicating that a user has viewed all of a first movie but only a segment of a second movie, a determination can be made that the user has fully viewed the first movie but has only partially viewed the second movie. In some instances, a segment of a content item that has been consumed may be determined, e.g., a number of minutes of the movie or a fraction of the movie's total playing time, and a content item can be identified as fully consumed, partially consumed, or unconsumed based on the amount of time or fraction satisfying one or more thresholds. For example, if less than 25 percent of a content item is identified as having been consumed by the user, the content item may be categorized as unconsumed by the user, if 25 percent to 75 percent of the content item is identified as consumed by the user, the content item may be categorized as partially consumed, and if more than 75 percent of the content item has been consumed by the user, then the content item may be identified as fully consumed.

In some implementations, a confidence score can be determined and associated with particular content that indicates a likelihood that the identified content has been correctly identified. For example, the consumption analysis engine 142 can determine content consumed by a user and can consider one or more factors associated with the consumption of the content to determine a confidence score to assign to the content and/or one or more entities associated with the content. For instance, a content item that has been identified based on cable television history data may be assigned a confidence score that indicates a higher likelihood of the content being correctly identified that a content item that has been identified using audio recognition. In some implementations, a higher likelihood may be indicated by a higher confidence score, e.g., a greater magnitude, may be indicated by a lower confidence score, e.g., a lower magnitude, or may be indicated using another scoring method. In practice, any number of factors may be used to determine a confidence score or other confidence scores to assign to particular content that has been consumed by a user, such as the source by which the content was recognized, the location or time associated with the content being consumed, etc.

For example, a separate confidence score can be determined that indicates a likelihood that identified content was fully consumed by a user. A content item can be categorized as having been fully consumed based on the determination that the user has likely viewed, listened to, read, or otherwise been exposed to a sufficient portion of the content item, e.g., 75 percent, and the confidence score can indicate an estimated likelihood that the user has actually fully consumed the content item. For instance, content that has been identified as consumed based on a receipt, e.g., a movie theatre receipt indicating that the user viewed a particular movie in theatres, may be assigned a confidence score that indicates a higher likelihood of the content item being fully consumed by the user than content that has been identified as consumed by the user based on an audio recognition process. In practice, any number of factors may be used to determine such a confidence score to assign to the particular content. For example, the segment of a movie's audio that is used to identify the movie may be indicative of whether the user has fully watched the movie, e.g., such that a movie recognized using audio from an opening scene of the movie receives a higher confidence score than a movie recognized based on audio from a closing scene of the movie. In other examples, a location or time associated with the user consuming the content can be indicative of whether the user fully consumed the content, e.g., such that if the user viewed a movie from 1:00 AM to 4:00 AM at their home, it is likely that the user has fallen asleep during the movie and not fully watched the movie.

In some implementations, one or more factors and/or confidence scores may be aggregated to determine an overall score associated with particular content that has been consumed by a user. For example, factors including a confidence by which the content was identified, a confidence that the content was fully consumed by a user, a source used to determine that the content was consumed by the user, a location, time, or device associated with the user consuming the content, etc., can be used to determine an overall score associated with the particular content. In some instances, such a score can also be identified for one or more entities associated with content, e.g., a particular actor that appears in a movie. Based on factors such as the amount of time that the actor appears in the movie, when the actor first appears in the movie, a popularity or success of the movie, etc., a score can be assigned to the entity corresponding to the actor.

In some implementations, feedback provided by a user may be used to identify or confirm content consumed by the user. For instance, based on determining that a user may have consumed particular content, a notification can be provided to a user, e.g., output at a client device associated with the user, that requests the user to confirm whether they have consumed the particular content and/or to confirm a location and time associated with the user consuming the content. For example, an audio recognition result may indicate that a user has recently viewed the movie "The Social Network," and a notification can be provided to the user that requests confirmation from the user that he or she has recently viewed the movie "The Social Network." Based on the user indicating that he or she has recently viewed the movie "The Social Network," the movie "The Social Network" can be identified as content that the user has consumed, and a location and time associated with the user consuming the content can be identified. In some instances, feedback provided by a user regarding particular content can result in changes to confidence scores associated with the content or one or more entities associated with the content, e.g., by increasing a confidence score associated with particular content based on the user confirming that they have consumed the particular content.

According to some implementations of the described subject matter, content and/or entities associated with content may be identified using a content or entity code. For example, the consumption analysis engine 142 or another component of the system 100 can identify a code, such as an alphanumeric code, quick response (QR) code, barcode, or other code that uniquely identifies a particular content item or entity. In some implementations, codes may be organized such that certain codes, code prefixes, or code types are associated with certain content types. For example, all movie content codes may begin with a certain letter or number, while all song content codes may begin with a different letter or number. A code that uniquely identifies a particular content item or entity can be associated with the content item or entity, e.g., by associating the code with the data identifying the content item or entity and the other relevant information, e.g., the location and time when the content was consumed.

Codes may be generated and assigned to content and/or entities associated with content by the system 100, e.g., by the content consumption sources 110($a$)-110($i$), the consumption analysis engine 142, or the content consumption engine 130. For example, based on receiving information indicating that a user has consumed content for which a code does not yet exist, e.g., a movie that has not yet been identified as viewed by the user and therefore has not been assigned a code, a code can be generated, e.g., by the content consumption source 110($a$)-110($i$) that reported the user watching the movie, the consumption analysis engine 142, or the content consumption engine 130, that uniquely identifies the movie, and the generated code can be assigned to the particular movie. Similarly, based on determining that one or more entities associated with the movie have not been assigned a code, e.g., one or more actors in the movie have not been assigned a code identifying the actor, codes can be generated and associated with the one or more entities that uniquely identify the entities.

In other implementations, codes associated with content items and/or entities associated with content items may be accessible to the system 100, e.g., over one or more networks. For example, the consumption analysis engine 142 may receive an indication that particular content has been consumed by a user, and the consumption analysis engine 142 can identify a code to assign to the content, e.g., by accessing a database over the one or more networks that includes codes associated with particular content items and entities associated with content items. In some implementations, codes associated with content items and/or entities associated with content items may be accessed by the system 100 prior to receiving an indication that the user has consumed particular content. For example, codes associated with content items and/or entities can be accessed and stored at the content consumption engine 130, and based on identifying content that the user has consumed, the consumption analysis engine 142 or another component can identify one or more codes associated with the content and/or entities and can assign the proper codes to the content and/or entities.

Based on determining content consumed by a user, relevance scores can be determined and associated with the content item and/or one or more entities associated with the content item. A relevance score may indicate an extent to which a user is perceived to like or be interested in a particular content item and/or entity, or may indicate the relevance of a particular content item to a particular entity associated with the content item and/or the relevance of a particular entity to a particular content item.

For example, a relevance score may indicate a likely level of interest that a user has in an identified content item or entity. In some implementations, such a relevance score may be determined based on information that identifies the content item consumed by the user and one or more entities associated with the content item. For instance, content identified as having been consumed by a user based on the user providing an endorsement of the content at a social network may be assigned a higher relevance score in comparison to other content identified as having been consumed by the user based on the user's cable television history. Other information may be used in determining a relevance score associated with a content item. For example, a relevance score may be increased based on receiving data indicating that a user has consumed particular content more than one time, e.g., has re-watched a movie, that indicates a location where the user has consumed the content, e.g., at a movie theatre as opposed to their home, etc. Based on the received data, a relevance score may be generated and assigned to the content item and/or the one or more entities associated with the content item.

A relevance score assigned to an entity and associated with a particular content item may reflect an extent to which the entity is featured or relevant to the particular content item. Similarly, a relevance score assigned to a content item and related to a particular entity may reflect an extent to which to which the particular content item is relevant to the particular entity. For example, the consumption analysis engine 142 can assign a relevance score to an actor associated with a movie in which the actor has the leading role such that the relevance score reflects a rather high level of relevance, based on the actor being a principal figure in the movie. Similarly, a relevance score assigned to a movie and associated with a particular actor may be assigned a rather high level of importance based on the movie being a movie that the actor is known for, e.g., that the actor has won an award for or that was a popular role for the actor.

In some implementations, content items and/or entities associated with content items may be assigned ranks based on confidence scores and/or relevance scores assigned to the content items and/or entities. For instance, two or more consumed content items that feature a particular entity, e.g., two or more movies that feature a particular actor, can be assigned a rank, where the rank is based on one or more confidence scores and/or relevance scores assigned to the content items. In such an example, a content item that is ranked first may be a content item in which the entity has considerable relevance, e.g., a main character in a movie, while a content item with a lower rank may be a content item in which the entity has less relevance, e.g., a movie in which the actor only has a supporting role.

According to some implementations, assigning confidence scores, relevance scores, and/or ranks to one or more content items and/or entities associated with content items can be performed by the consumption analysis engine 142. For example, the consumption analysis engine 142 may access information relevant to two or more content items, e.g., on the Internet, and assign confidence scores and relevance scores to the two or more content items. For example, information accessed may indicate the role of an actor in each of two movies, and relevance scores may be assigned to the two movies based on the extent to which the movies feature the actor. The relevance scores can be maintained, e.g., at the content consumption engine 130, and the consumption analysis engine 142 may rank the two movies and/or other movies based on accessing the scores maintained at the content consumption engine 130.

Information identifying content consumed by a user, a location and time when the user consumed the content, and other identified information can be stored at a media consumption history database associated with the content consumption engine 130. For example, the consumption analysis engine 142 and/or the content consumption sources 110(a)-110(i) can transmit information related to content consumed by a user to the content consumption engine 130 over one or more networks, and the content consumption engine 130 can receive and store the information. In some instances, the information can be stored at a media consumption history database associated with the content consumption engine 130.

Storing information related to content consumed by a user at the content consumption engine 130 can include storing entries 132(b)-132(n) corresponding to the content items consumed by the user. The entries 132(b)-132(n) can identify content items that have been categorized as consumed by the user, e.g., that have been identified in information received at the one or more content consumption sources 110(a)-110(i) as having been consumed by the user. Each of the entries 132(b)-132(n) can identify a particular content item, e.g., using the name of the content item and/or a code associated with the content item, as well as additional information corresponding to the consumed content.

As shown in FIG. 1, information associated with the entries 132(b)-132(n) can include information identifying the content type, e.g., movie, television show, album, soundtrack, magazine, etc., the cast or artists associated with the content, e.g., one or more actors, singers, writers, or other entities associated with the content, a time when the content was consumed by the user, e.g., 8:00 PM on Jul. 4, 2013, a location associated with the user's consumption of the content, e.g., "Radio City Music Hall," a source of identification of the consumed content, e.g., a post at a social network, an email containing a ticket receipt, a Netflix purchase history, etc., and other information associated with the user's consumption of the content and/or the content itself. For instance, additional information may include one or more scores or ranks associated with the content, information associated with the production of the content, information identifying content that is similar or related to the content, one or more other users that are associated with the content or the user's consumption of the content, etc.

In some implementations, additional entries 132(b)-132(n) that correspond to entities associated with content may be maintained at the content consumption engine 130. For example, based on receiving information identifying content that has been consumed by a user, the content consumption engine 130 can identify one or more entities associated with the content that has been consumed by the user, and can include entries corresponding to the entities associated with the consumed content in the entries 132(b)-132(n). For example, the content consumption engine 130 can receive information identifying the movie "The Social Network" as content that has been consumed by the user, and can identify one or more entities associated with the movie, e.g., the actors "Justin Timberlake," "Jesse Eisenberg," and the director "David Fincher." Entries corresponding to the actors "Justin Timberlake" and "Jesse Eisenberg," as well as the director "David Fincher," can be included in the entries 132(b)-132(n) maintained at the media consumption history database of the content consumption engine 130, where the entries 132(b)-132(n) corresponding to "Justin Timberlake," "Jesse Eisenberg," and "David Fincher" can identify information and/or one or more entities associated with the entries 132(b)-132(n), e.g., one or more content items associated with each of "Justin Timberlake," "Jesse Eisenberg," and "David Fincher," and other information.

The data stored at the content consumption engine 130 and corresponding to one or more content items consumed by a user and/or entities associated with content items consumed by a user can be stored in any number of formats. For instance, data may be stored in a tabular format or other data matrix, or in a hierarchical data structure. In some implementations, each entry 132(b)-132(n) may correspond to a particular row or column of the data matrix, and information associated with each of the content items and/or entities associated with content may be included as entries in the row or column of the data matrix. Similarly, in other implementations, each entry 132(b)-132(n) may correspond to a particular high-level item in the hierarchical data structure, and information associated with each of the content items and/or entities associated with the content may be included as lower-level items depending from the high-level items in the hierarchical data structure.

In some implementations, a subset of the information associated with the entries 132(b)-132(n) can be stored at locations other than the content consumption database 130. For example, information identifying a particular content item that has been consumed by a user and information associated with the user's consumption of the content item, e.g., a time and location associated with the user consuming the content, can be maintained at the content consumption engine 130, and additional information associated with the content item, e.g., information identifying the cast of the content item, can be stored elsewhere, e.g., at a server external to the content consumption engine 130. In such instances, accessing information associated with a content item that has been consumed by the user can involve accessing information associated with an entry 132(b)-132(n) at the content consumption database 130 that corresponds to the content item as well as accessing information associated with the content item at an additional resource that is external to the content consumption engine 130, e.g., at another server accessible to the query engine 120 and/or query analysis engine 144. In some instances, accessing the information associated with the content, e.g., information identifying the cast of the content item, can be achieved by accessing a source of the content and/or the content item itself. For example, the additional information associated with the content item can be accessed at a location where the content item is stored or by accessing metadata associated with the content item.

Entries 132(b)-132(n) may be identified and accessed to obtain information relating to one or more content items consumed by a user and/or entities associated with content items consumed by the user. In some implementations, content and/or entities associated with content may be identified at the content consumption engine 130 using a code that uniquely identifies particular content items and/or entities. In other instances, content and/or entities associated with content can be identified based on a search performed at the content consumption engine 130, e.g., a search that specifies a name of the content or entity.

In some implementations, content, entities associated with content, and/or information relating to the content and/or entities can be identified at the media consumption history database of the content consumption engine 130 by performing expansion of the entries 132(b)-132(n). For example, an entry associated with a particular movie can be identified, and the entry can be expanded to reveal additional information associated with the entry. For instance, the expansion of a particular entry associated with a particular content item can enable the identification of a content type associated with the content item, one or more actors, artists, writers, or other entities associated with the content, a time associated with the user's consumption of the content, a location associated with the user's consumption of the content, a source of the indication that the user consumed the content, etc.

Based on the content consumption engine 130 maintaining entries 132(b)-132(n) identifying content and/or entities associated with content that has been consumed by a user, requests for information input by the user can be processed such that responses to the requests provide information that is relevant to content that has been consumed by the user. For example, a user can access a query engine 120, e.g., an interface that is associated with a search engine, and can provide one or more query terms at a query input field 122.

Content and/or entities associated with content can be identified from the terms of the user-input query, and content consumed by the user or entities associated with content consumed by the user can be identified. A response to the user-input query can identify the content consumed by the user and/or entities associated with content consumed by the user that correspond to the content and/or entities identified from the terms of the user-input query. Such results may also include additional information relevant to the content consumed by the user and/or entities associated with the content consumed by the user, such as a time and location where the user consumed the identified content or content associated the entities.

The query engine 120 can include an interface capable of receiving a user input that requests information. In some implementations, query engine 120 may be an application interface that accepts textual input or voice input provided by a user. For example, the query engine 120 may be a personal assistant application associated with a computing device of a user, such as a user's cellular phone, smartphone, tablet computer, laptop computer, desktop computer, mp3 player, wearable computing device, or other device. In other applications, the query engine 120 may be a system that is accessible on the Internet, e.g., at a web page associated with a search engine, or that is accessible using other means, e.g., by accessing a database or server system over one or more networks, such as one or more local area networks (LAN) or wide area networks (WAN).

The query engine 120 can identify a user that has provided a query or other request for information. For instance, a user can be identified based on identifying a name of the user, based on identifying a user account, e.g., an account associated with a user, a client device of a user, an email account of a user, an account associated with the query engine 120, etc., based on identifying a user from voice data associated with a voice input query, based on identifying a code assigned to the user that uniquely identifies the user, e.g., an alphanumeric code associated with the user, based on identifying a code or other identifier associated with a client device of the user, e.g., an internet protocol (IP) address associated with the user's device, or using another method. In some implementations, a query received at the query engine 120 can be a voice input query, and the query engine 120 can perform voice recognition to determine terms of the voice input query. In other implementations, the query engine 120 can transmit voice data corresponding to the voice input query to the query analysis engine 144 or to another system, and the query analysis engine 144 or other system can perform voice recognition to determine the terms of the voice input query. In some implementations, determining terms of a voice input query can involve obtaining a transcription of the voice input query and determining terms of the voice input from the text of the transcription of the voice input query.

The query engine 120 can receive inputs from a user, for example, at the query input field 122, and can display results of the query at a results field 124. In some instances, the query engine 120 obtains results by submitting a received query and information identifying the user to the query analysis engine 144 and/or content consumption engine 130 over one or more networks, and receiving results from the query analysis engine 144 and/or content consumption engine 130 over the one or more networks.

In greater detail, the query analysis engine 144 receives data identifying a user and terms associated with a user input query, and performs analysis of the terms to identify content and/or entities associated with the query. For example, the query analysis engine 144 can parse the text of the query, e.g., the one or more terms of the query, and can identify objects from the text of the query. Objects can include nouns or phrases from the text of the query, e.g., one or more proper nouns, phrases, nouns, or other parts of speech that may correlated to content, e.g., a name of a movie, or entities associated with content, e.g., a name of an actor.

Based on identifying objects from the query, the query analysis engine 144 can identify content items and/or entities associated with content items that correspond to the objects. In some instances, the query analysis engine 144 can identify content items and/or entities based on accessing a database that stores the names of content items and/or entities associated with content items, e.g., by accessing the database over one or more networks. In some instances, the database may be associated with the content consumption engine 130, or can be a database associated with another system, e.g., that is external to the system 100 and that is accessible over the one or more networks. In some instances, identifying content items and/or entities associated with content items that correspond to the objects can include identifying a code or other identifier associated with the content items and/or entities associated with the content items. For example, the query analysis engine 144 can identify the figure "Justin Timberlake" from the objects included in the query, and can further identify an alphanumeric code that uniquely identifies the figure "Justin Timberlake."

In some implementations, the query analysis engine 144 may be an application hosted on one or more computers, may be associated with a server, or may be another system capable of identifying content and/or entities based on terms included in a query. In some implementations, the query analysis engine 144 is a separate component from both the query engine 120 and the content consumption engine 130, or can be integrated with the query engine 120 and/or the content consumption engine 130. The query analysis engine 144 may be capable of exchanging electronic communications over one or more networks, for example, to exchange electronic communications with the query engine 120 and/or the content consumption engine 130, or to access information that is available on the Internet.

The query analysis engine 144 communicates with the content consumption engine 130 to identify content that the identified user has consumed or entities associated with the user-consumed content corresponding to the content and/or entities identified from the query. For example, the query analysis engine 144 can identify one or more content items and/or entities associated with content items from the terms of the query, and can transmit information identifying the one or more content items and/or entities associated with content items to the content consumption engine 130. In some implementations, the query analysis engine 144 can additionally transmit information identifying the user to the content consumption engine 130.

The content consumption engine 130 can receive data identifying the user and the content and/or entities identified from the query, and can identify content that has been consumed by the user that corresponds to the content and/or entities identified from the query. For example, the content consumption engine 130 can receive data identifying the user that input the query from the query engine 120 or the query analysis engine 144, and can receive data identifying one or more content items and/or entities associated with content items that have been identified from the query from the query analysis engine 144. The content consumption engine 130 can receive the data identifying the user and the one or more content items and/or entities over one or more networks.

In some implementations, the content consumption engine 130 can identify content that the identified user has consumed. For example, based on receiving data identifying the user that provided the query, the content consumption engine can identify entries 132(b)-132(n) at the media consumption history database associated with the content consumption engine 130 that identifies content that has been consumed by the user. In some instances, users can be identified by the user's name, by an account associated with the user, by a code associated with the user, or by a code or other identification associated with a client device of the user, e.g., an IP address associated with the user's device. The content consumption engine 130 can receive the information identifying the user and can identify entries 132(b)-132(n) that are associated with the user based on the entries 132(b)-132(n) specifying the user identifier corresponding to the user, e.g., the particular IP address, code, account name, or other information identifying the user.

Based on identifying entries 132(b)-132(n) that are associated with the user, entries that correspond to the content and/or entities identified from the query can be determined. For instance, based on the query identifying the figure "Justin Timberlake," one or more entries associated with the user can be identified that correspond to the figure "Justin Timberlake." Entries that may correspond to the figure "Justin Timberlake" may include, for example, the entry corresponding to the movie "The Social Network," in which "Justin Timberlake" was an actor.

In some implementations, identifying entries that correspond to the content and/or entities identified from the query can involve expanding the entries 132(b)-132(n) stored at the media consumption history database of the content consumption engine 130 to identify entries that identify the particular content and/or entities identified from the query. In some implementations, identifying entries that correspond to the content and/or entities identified from the query can involve performing a search at the media consumption history database associated with the content consumption engine 130 for the particular content and/or entities. For instance, identifiers for the content and/or entities identified from the query, e.g., the names or codes used as identifiers of the content and/or entities can be submitted as a query on the media consumption history database, and one or more content items and/or entities corresponding to those identified from the query can be determined. Other techniques may be used to identify entries from among the entries 132(b)-132(n) corresponding to the user that are related to the content and/or entities identified from the query.

Based on identifying one or more content items consumed by the user and/or entities associated with content items consumed by the user that correspond to the content and/or entities identified from the query, data identifying the one or more user-consumed content items and/or entities associated with user-consumed content items can be transmitted by the content consumption engine 130. For instance, the content consumption engine 130 can transmit information identifying the one or more user-consumed content items and/or entities associated with user-consumed content items to the query analysis engine 144 over one or more networks. In some instances, transmitting data that identifies the user-consumed content items and/or entities associated with user-consumed content items can involve transmitting data that includes additional information relating to the user-consumed content items and/or the entities associated with the user-consumed content items. The additional information may include information such as a location and time when content was consumed by the user, other content items and/or entities relevant to the user-consumed content and/or entities associated with user-consumed content, one or more scores associated with the user-consumed content and/or entities associated with the user-consumed content, one or more users associated with the user-consumed content and/or entities associated with the user-consumed content, or other information that has been determined and stored in association with the entries at the media consumption history database, e.g., other information determined by the content consumption sources 110(a)-110(i), the consumption analysis engine 142, and/or the content consumption engine 130.

The query analysis engine 144 can receive the information relating to the user-consumed content and/or entities associated with user-consumed content that correspond to the query, and can perform analysis of the information relating to the user-consumed content and/or entities associated with the user-consumed content. In some implementations, the analysis performed by the query analysis engine 144 can include determining the relevance of the identified user-consumed content and/or entities associated with user-consumed content to the content and/or entities identified from the query. For example, the query analysis engine 144 can determine the relevance of the movie "The Social Network" to the figure "Justin Timberlake."

In some implementations, identifying the relevance of identified user-consumed content and/or entities associated with user-consumed content can include determining or generating a relevance score for the user-consumed content and/or entities associated with user-consumed content. For example, a relevance score can be determined for the movie "The Social Network" that the user has watched in relation to the figure "Justin Timberlake." In some implementations, as described, the relevance score can be determined based on the extent to which entities are featured or relate to particular content items, e.g., based on whether an actor has a large role in a movie or a small role in a movie, and/or based on the extent to which two content items are related, e.g., based on the extent to which two movies are associated with one another by being sequels to one another, by featuring the same actors or directors, etc. In some implementations, the query analysis engine 144 can generate a relevance score, e.g., based on the factors described, or can identify a relevance score that has already been assigned to the content consumed by the user and/or entities associated with content consumed by the user, e.g., that has been assigned by the consumption analysis engine 142. In other implementations, the query analysis engine 144 can identify relevance scores associated with user-consumed content and/or entities associated with user-consumed content that have been determined by the consumption analysis engine 142.

In some instances, the query analysis engine 144 can determine a relevance score for the user-consumed content and/or entities associated with user-consumed content based on other objects or terms of a query. For example, one or more terms or objects that do not correspond to content and/or entities associated with content can be identified from a query. Based on receiving information identifying content consumed by the user and/or entities associated with content consumed by the user, a relevance score can be determined for each of the content items consumed by the user and/or entities associated with content items consumed by the user that reflect the relevance of the content items and/or entities to the other objects or terms. For example, based on determining that the query received from the user identifies the figure "Justin Timberlake" and also identifies the object "Mark Zuckerberg," which does not correspond to a particular content item or entity associated with a content item, the query analysis engine 144 may determine that the movie viewed by the user called "The Social Network" is highly relevant, based on the movie "The Social Network" featuring a character named "Mark Zuckerberg." In some implementations, the query analysis engine 144 can identify synonyms or related terms for the objects or terms of the query, and a relevance score can reflect the relevance of a content item and/or entity to the synonyms or related terms.

In some implementations, based on the identified and/or determined relevance scores, ranks can be determined for the content items and/or entities associated with content items that indicate the relevance of the user-consumed content and/or entities associated with the user-consumed content to the query. For example, based on determining relevance scores for each of the user-consumed content items and/or entities associated with the user-consumed content items, ranks can be assigned to the user-consumed content items and the user-consumed entities such that content items and/or entities having a relevance score indicating greater relevance will have a higher rank, while content items and/or entities having a relevance score indicating less relevance will have a lower rank. In some instances, the query analysis engine 144 can receive information indicating ranks for the content items consumed by the user and/or entities associated with content items consumed by the user, and the query analysis engine can use the indicated ranks as the ranks indicating the relevance of the user-consumed content items and the entities associated with the user consumed content items to the query.

The query analysis engine 144 can transmit data identifying and indicating the relevance of the user-consumed content and/or entities associated with the user-consumed content that are associated with the content and/or entities identified from the query to the query engine 120. For example, the query analysis engine 144 can transmit the data received at the query analysis engine 144 from the content consumption engine 130 that identifies the user-consumed content and/or entities associated with the user-consumed content to the query engine 120, and can also transmit data indicating the relevance of the identified user-consumed content and/or entities associated with the user-consumed content to the query engine 120. In some implementations, the data can be transmitted by the query analysis engine 144 to the query engine 120 over one or more networks.

The query engine 120 can receive the data from the query analysis engine 144 and can provide information for output to the user that provided the query. For example, the query engine 120 can receive information identifying the content that has been consumed by the user and/or entities associated with the content that has been consumed by the user that is associated with the query input by the user, as well as data identifying the relevance of the identified content and/or entities associated with the content. The query engine 120 can determine, based on the received information, information and/or resources to provide for output at the results field 124. For example, based on receiving the query that identifies the figure "Justin Timberlake," the query engine 120 can determine to output results that indicate personal information relating to "Justin Timberlake," e.g., his age, height, occupation, etc., as well as information relevant to the user regarding the figure "Justin Timberlake," e.g., information indicating that the user has seen "Justin Timberlake" in the movie "The Social Network," which the user watched at 8:00 PM on Jul. 4, 2013 at a particular location. In some instances, the information provided for output by the query engine 120 can include information not contained in the information received from the query analysis engine 144, e.g., can include information that was accessed over the Internet or at another system external to the system 100. In some instances, the information provided for output at the results field 124 by the query engine 120 can include information received from the query engine 144, such as segments of content relevant to the query that a user has consumed, or other information. In some instances, the query engine 120 can provide information for output at the results field 124 such that information accessed external to the system 100 is delineated from the information provided for output that was received from the query analysis engine 144, e.g., such that the two sets of information are displayed in different information panels.

Figure 2:
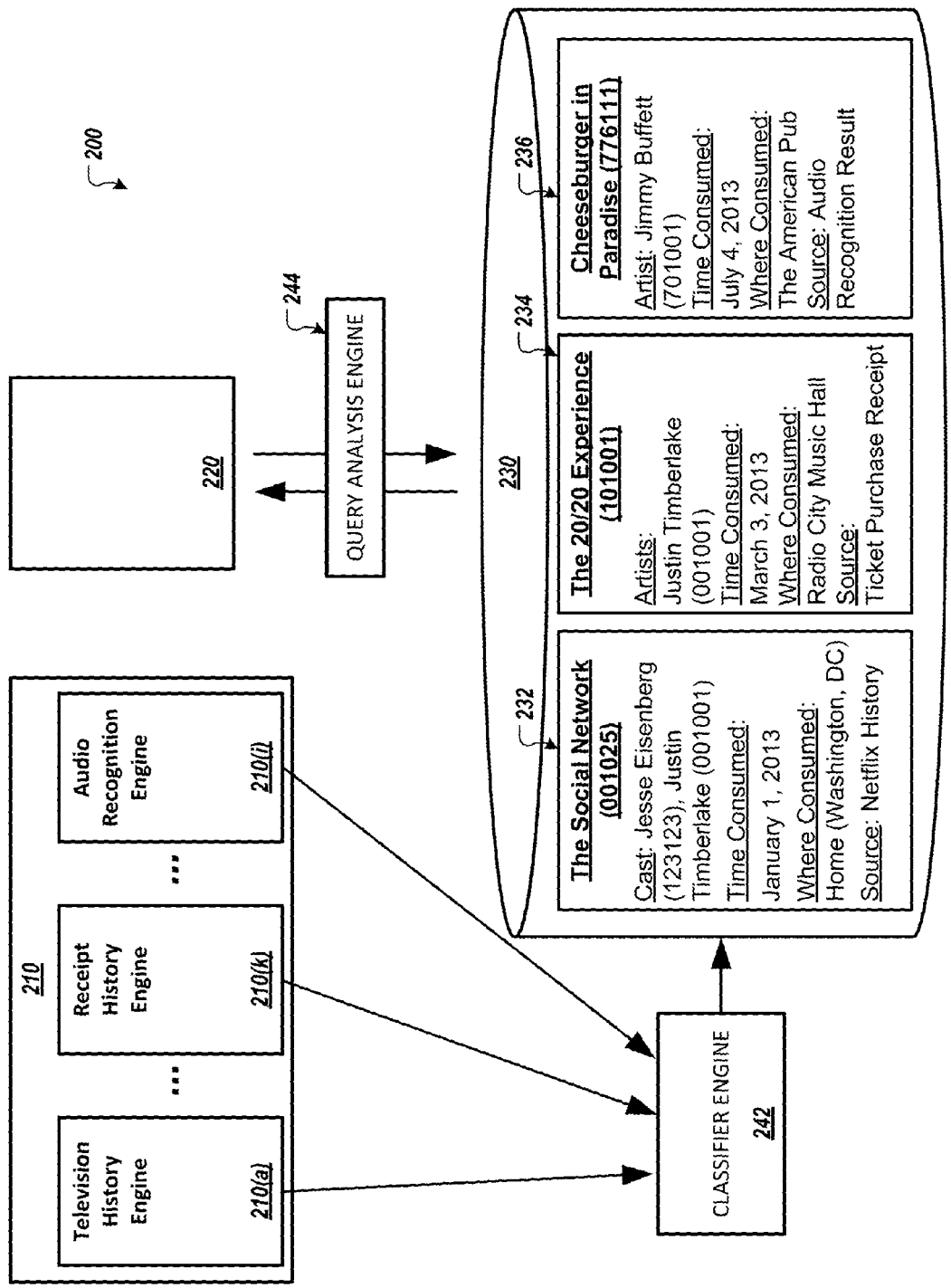
FIGS. 2 and 3 depict portions of example systems for responding to requests based on a media consumption history.

FIG. 2 depicts a portion of an example system 200 for creating a media consumption history and utilizing the media consumption history to respond to requests. For example, the system 200 can be capable of receiving data identifying content consumed by a user, determining content associated with the user's consumption of the content, and storing information identifying the content consumed by the user and information associated with the user's consumption of the content. The system 200 includes one or more content consumption sources 210(*a*)-210(*i*) that are included in a content consumption source engine 210, a classifier engine 242, a query engine 220, a query analysis engine 244, and a content consumption engine 230. In some instances, the components of the system 200 can perform operations similar to those performed by the system 100.

The content consumption sources 210(*a*)-210(*i*) can receive information that identifies content that a user has consumed. For example, the television history engine 210(*a*), receipt history engine 210(*k*), and audio recognition engine 210(*i*) can each receive information that identifies content consumed by a user. For instance, content consumed by a user can include a movie that a user has viewed on television, and the television history engine 210(*a*) can receive information identifying the movie viewed by the user, as well as additional information associated with the user viewing the movie. In another example, the receipt history engine 210(*k*) can receive information identifying content that has been identified as consumed by a user, based on the receipt history engine 210(*k*) identifying a receipt that the user has received and a content item associated with the receipt. For example, the receipt history engine 210(*k*) can identify a receipt that indicates that the user has attended a concert, and the receipt history engine 210(*k*) can identify content associated with the concert, e.g., a recent album released by the artist who performed at the concert. In another example, the audio recognition engine 210(*i*) can receive a request input by a user to identify content corresponding to audio data obtained from the environment of the user, and the audio recognition engine 210(*i*) can identify the audio as corresponding to particular content. The audio recognition engine 210(*i*) can then identify the recognized content as content that has been consumed by the user. In another implementation, the audio recognition engine 210(*i*) can receive information identifying content that has been identified by an audio recognizer, e.g., an audio recognizer that is external to the system 200, and can determine that the user has consumed the identified content.

In some implementations, as described, information may be received by the content consumption sources 210(*a*)-210(*i*) of the content consumption source engine 210 in addition to the data identifying content consumed by the user. For instance, additional information may identify locations and times when the user consumed particular content, or can identify other information associated with the user's consumption of the content. The content consumption source engine 210 or the content consumption sources 210(*a*)-210(*i*) can transmit data identifying the content consumed by the user and the additional relevant information to the classifier engine 242.

The classifier engine 242 can receive the data identifying content consumed by the user and can perform analysis on the received data. For instance, the classifier engine 242 can determine a content type for each of the identified content items, for example, by identifying a content item as a movie, album, song, etc. The classifier engine 242 can access additional information relevant to the identified content. Such information can include additional information relevant to the content items, e.g., by identifying one or more entities associated with the content items, identifying information relating to the production of the content items, identifying content items related to the identified content items, identifying other users associated with the user's consumption of the content items, etc.

Based on determining a content type for each of the content items and identifying additional information relevant to the content items, the classifier engine 242 can transmit information identifying the content consumed by the user, the content type associated with each of the content items consumed by the user, and the additional information relevant to the content items consumed by the user. In some instances, as shown in FIG. 2, the classifier engine can transmit the information to the content consumption engine 230.

The content consumption engine 230 can receive the information identifying content consumed by the user and other relevant content, and can store the information as entries in a media consumption history database associated with the content consumption engine 230. In some implementations, the content consumption engine 230 can generate entries at the media consumption history database that correspond to the content items identified as consumed by the user. In some instances, entries generated at the media consumption history database can also include entries that correspond to entities associated with the content items identified as consumed by the user. For example, the media consumption history database generates entries corresponding to the actors or a director of a movie, artists associated with a song or album, writers associated with a magazine or screen play, etc. In some implementations, as described, codes can be assigned to one or more content items consumed by the user and/or entities associated with content items consumed by the user.

For example, based on receiving data from the classifier engine 242, entries 232, 234, and 236 can be generated at the content consumption engine 230 that correspond to content items consumed by a user. For example, based on the television history engine 210(*a*) determining that the user has viewed the movie "The Social Network," an entry 232 is generated at the content consumption engine 230 that corresponds to the movie "The Social Network." For instance, the entry 232 is associated with the movie "The Social Network," where the movie "The Social Network has been assigned a code "001025," and where the entry 232 includes additional information relating to the movie "The Social Network" and the user's viewing of "The Social Network." As shown, such information includes information identifying one or more cast members of the movie, e.g., the actors "Jesse Eisenberg (123123)" and "Justin Timberlake (001001)," a time when the movie was viewed by the user, e.g., Jan. 1, 2013, a location where the user viewed the movie, e.g., at their home in Washington, D.C., and a source that identified the movie as having been viewed by the user, e.g., a Netflix television history. In other implementations, as described, the entry 232 can include a subset of the information associated with the content item and the consumption of the content item. For example, the entry 232 can identify information associated with the consumption of the movie "The Social Network" by the user, e.g., a time and location where the user watched the movie, and information associated with the content item "The Social Network," e.g., the cast of the movie, can be identified at another source, e.g., at a server that stores information associated with the movie "The Social Network."

Similarly, the entry 234 can be generated at the content consumption engine 230 that corresponds to the album "The 20/20 Experience." For instance, the entry 234 can be associated with the album "The 20/20 Experience," where the album has been assigned a code "101001," and where the entry 234 includes additional information relating to the album "The 20/20 Experience" and the user's consumption of the content. Such information can include, for example, information identifying an artist associated with the album "The 20/20 Experience," e.g., the artist "Justin Timberlake (001001)," a time when the user is identified as having consumed the content, e.g., Mar. 3, 2013, a location where the content was consumed by the user, e.g., "Radio City Music Hall," and a source that identified the content as having been consumed by the user, e.g. a receipt corresponding to a concert ticket purchased by the user to attend a concert by "Justin Timberlake" at "Radio City Music Hall" on Mar. 3, 2013.

As another example, the entry 236 is generated at the content consumption engine 230 that corresponds to the song, "Cheeseburger in Paradise," where the song "Cheeseburger in Paradise" has been assigned the code "776111." The entry 236 also includes information relating to the song "Cheeseburger in Paradise" and the user's exposure to the song "Cheeseburger in Paradise." For example, as shown, in FIG. 2, the song "Cheeseburger in Paradise" is associated with the artist "Jimmy Buffett (701001)," was listened to by the user on Jul. 4, 2013, was listened to at a location called "The American Pub," and was identified as having been consumed by the user based on an audio recognition request.

Requests for information can be received at a query engine 220, and responses to the requests for information can include information associated with entries stored at the media consumption history database that identify content consumed by the user. For example, a user can provide a query at a search engine associated with the query engine 220, and the query engine 220 can submit the terms of the search query to a query analysis engine 244.

The query analysis engine 244 can receive information identifying the terms of the search query, and can identify one or more content items and/or entities associated with the search query. Data identifying the one or more content items and/or entities associated with the query can be submitted to the content consumption engine 130. The content consumption engine 230 can identify content that has been consumed by the user and/or entities associated with content consumed by the user that correspond to the content items and/or entities identified from the search query. For example, content consumed by the user and/or entities associated with content consumed by the user can be identified by accessing entries stored at the media consumption history database that are associated with the user. Information relating to the identified content items consumed by the user and/or entities associated with content items consumed by the user can be transmitted to the query engine 220, e.g., based on the query analysis engine 244 determining the most relevant information to provide to the query engine 220 in response to the search query. The query engine 220 can receive the information, and can provide a response to the search query that identifies content items consumed by the user and/or entities associated with content items consumed by the user that correspond to the search query. In some implementations, the response to the search query can include additional information relating to the content consumed by the user, e.g., a location and time when the user consumed the content.

Figure 3:
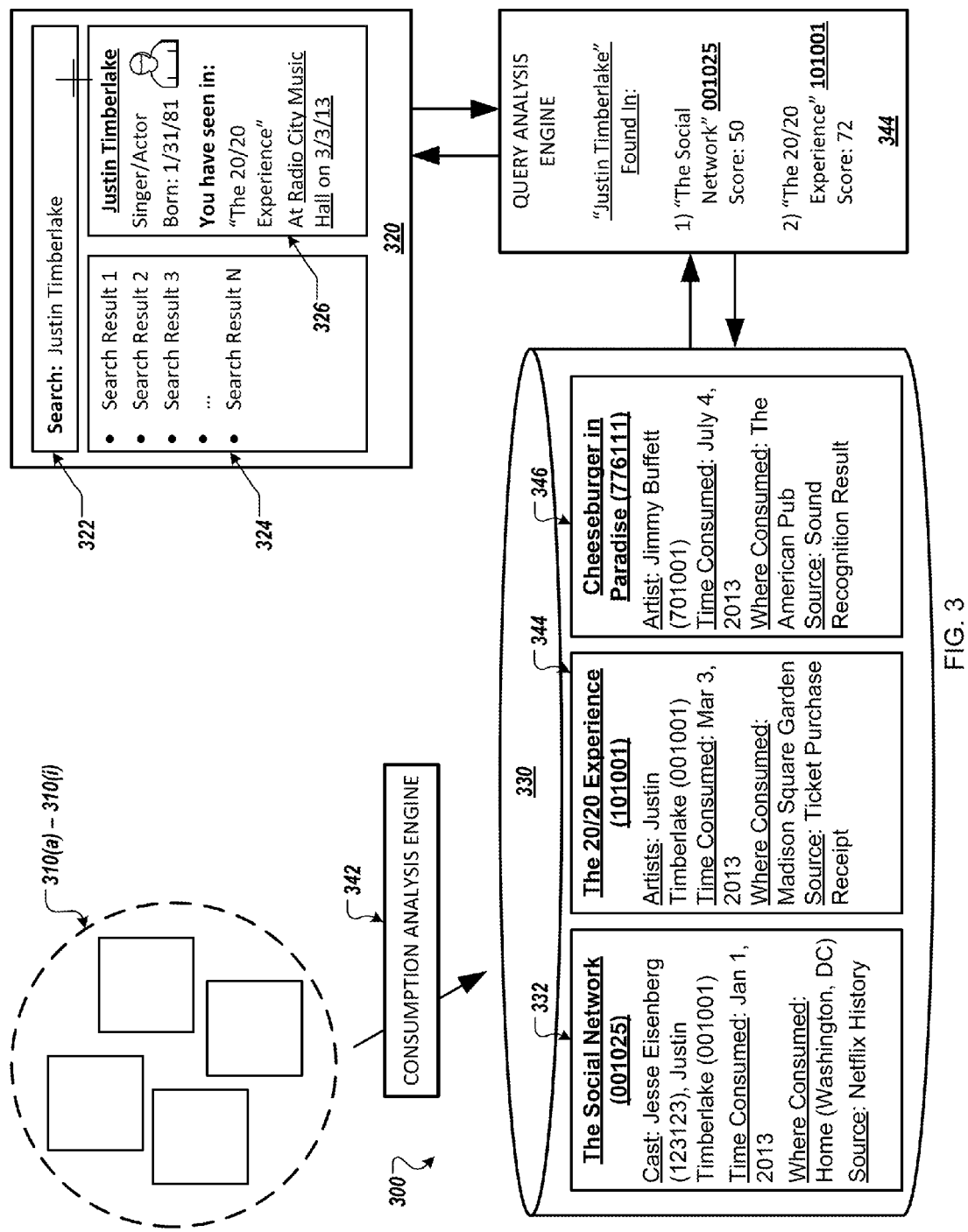

FIG. 3 depicts a portion of an example system 300 for accessing a media consumption history in response to requests for information. For example, the system 300 can be capable of receiving a request for information, determining content that has been consumed by a user and/or entities associated with content that has been consumed by the user that relate to the request for information, and providing a response to the request for information that identifies the content and/or entities that correspond to the request for information. As shown, the system 300 includes a query engine 320, a query analysis engine 344, a content consumption engine 330, a classifier engine 342 and one or more content consumption sources 310(a)-310(i). In some instances, the components of the system 300 can perform operations similar to those performed by the system 100.

The content consumption engine 330 can include a media consumption history database that identifies content that has been consumed by a user and/or entities associated with content that has been consumed by the user. For example, as shown in FIG. 3, the content consumption engine 330 can include the entries 332, 334, and 336 identifying the content items "The Social Network," "The 20/20 Experience," and "Cheeseburger in Paradise," respectively, that have been indicated as consumed by the user. The entries 332, 334, and 336 can be similar to the content items 232, 234, and 236 identified with respect to FIG. 2. As shown, the entries 332, 334, and 336 identify content items consumed by a user, as well as information relating to the content items and/or the user's consumption of the content items. In some instances, the entries 332, 334, and 336 include information that has been received and/or identified by the classifier engine 342 or content consumption sources 310(a)-310(i).

A user can provide a request for information at a query engine 320. According to one implementation for utilizing a media consumption history, for example, a user can access a search engine, e.g., at a webpage that is accessible over the Internet, and can input a search query at a query input field 322 accessible at an interface of the search engine. In one example, the user can input the search query "Justin Timberlake" at the query input field 322 to request information relating to the figure "Justin Timberlake." Based on receiving the input requesting information relating to "Justin Timberlake," the query engine 320 can submit the terms of the query request, for example, by submitting the query request to the query analysis engine 344.

As described, the query analysis engine 344 can receive data from the query engine 320 that includes the terms of the search query, and can identify one or more content items and/or entities associated with the search query. For example, based on receiving the search terms "Justin" and "Timberlake" from the query engine 320, the query analysis engine 344 can identify the entity "Justin Timberlake." In some instances, identifying a particular content item and/or entity associated with a content item can include identifying a code that identifies the content item and/or entity. For example, based on identifying the entity "Justin Timberlake," a code associated with "Justin Timberlake" can be identified, e.g., the code "001001." Based on identifying the entity "Justin Timberlake (001001)," the query analysis engine 344 can communicate with the content consumption engine 330 to identify content items that have been consumed by the user that correspond to the entity "Justin Timberlake (001001)" and/or entities associated with content that has been consumed by the user that correspond to the entity "Justin Timberlake (001001)."

For example, the information associated with the entries 332, 334, and 336 can be accessed to determine which, if any, of the content items associated with the entries 332, 334, and 336 correspond to the entity "Justin Timberlake (001001)." In some instances, entries can be identified that match the entity "Justin Timberlake (001001)" based on matching the entity "Justin Timberlake (001001)" against the names of the entries 332, 334, 336, e.g., by determining if any of the titles of the entries 332, 334, 336 include "Justin Timberlake." In other instances, the entries 332, 334, 336 can be expanded to determine if any of the entries 332, 334, 336 include information that identifies the entity "Justin Timberlake." For example, the entity "Justin Timberlake (001001)" can be matched against the information associated with the entries 332, 334, and 336, e.g., the cast and/or artists associated with the entries 332, 334, 336, or other entities identified as being associated with the entries 332, 334, 336.

Identifying content items and/or entities associated with a search query can further include identifying content items and/or entities that are identified as relevant to a particular query or to responding to a particular query. For example, the query analysis engine 344 can receive data from the query engine 320 that includes terms of a search query, and the query analysis engine 344 can identify one or more content items and/or entities that are relevant to providing a response to the search query. For instance, a user may input the query, "Who is Jessica Biel's husband," and in response to the query, the query analysis engine 344 can identify "Justin Timberlake" as the husband of "Jessica Biel" and/or one or more entities associated with "Justin Timberlake," e.g., one or more movies that feature "Justin Timberlake" that the user has consumed.

In some implementations, the query analysis engine 344 can identify content items and/or entities that are relevant to providing a response to a search query by accessing information that identifies content items and/or entities that correspond to the terms of the search query. For example, the query analysis engine 344 can identify the terms "Jessica," "Biel," and "husband" from a search query, and can access information at the content consumption engine 330 or at another location, e.g., information that is accessible on the Internet, that corresponds to the terms of the search query. Based on accessing the information that corresponds to the terms of the search query, e.g., that indicates that the husband of "Jessica Biel" is "Justin Timberlake," the query analysis engine 344 can access information that identifies content items and/or entities that are relevant to the query and/or to responding to the query, e.g., information that identifies one or more content items that feature "Justin Timberlake" that the user has consumed.

Based on determining that one or more of the entries 332, 334, 336 correspond to the entity "Justin Timberlake (001001)," information identifying the entries that correspond to the entity "Justin Timberlake (001001)" can be received at the query analysis engine 344. For example, the entries 332 and 334, associated with the content items "The Social Network (001025)" and "The 20/20 Experience (101001)," can be identified as entries that correspond to the entity "Justin Timberlake (001001)" identified from the search query. For instance, a determination can be made that "The Social Network (001025)" features "Justin Timberlake (001001)" as an actor, and that "The 20/20 Experience (101001)" features "Justin Timberlake (001001)" as an artist. Based on determining that the entries 332 and 334 are relevant to the entity "Justin Timberlake (001001)," information associated with the entries 332 and 334 can be received at the query analysis engine 344, e.g., the content consumption engine 330 can transmit information associated with the entries 332 and 334 to the query analysis engine 344.

In other implementations, information associated with all of the entries stored at the media consumption history database of the content consumption engine 330 that are associated with the user can be transmitted to the query analysis engine 344, and the query analysis engine 344 can determine which of the entries correspond to the search query. For example, information associated with the entries 332, 334, and 336 can be transmitted to the query analysis engine 344, and the query analysis engine can identify which of the entries 332, 334, and 336 are relevant to the content items and/or entities identified from the search query.

A relevance score can be applied to each of the entries 332, 334, 336 and/or the entries 332, 334 identified as relevant to the search query that indicates an extent to which an entry is relevant to the search query. For example, relevance scores can be determined and assigned to the entry 332 associated with "The Social Network (001025)" and the entry 334 associated with "The 20/20 Experience (101001)" that indicate a relevance of each of the entries to the entity "Justin Timberlake (001001)" identified from the search query. As described, the relevance score applied to the entries 332, 334 can reflect the extent to which the entry relates to the search query, e.g., based on the role of "Justin Timberlake (001001)" in "The Social Network (001025)" and based on the role of "Justin Timberlake (001001)" in "The 20/20 Experience (101001)." For example, an analysis performed by the query analysis engine 344 can determine a relevance score of 50 to assign to the entry 332 associated with the "Social Network (001025)" and a relevance score of 72 to assign to the entry 334 associated with "The 20/20 Experience (101001)." In some implementations, relevance scores can be assigned to all of the entries 332, 334, 336 of the media consumption history database, for example, by assigning a score of zero or another score indicating non-relevance to those entries that are identified as not relating to the search query, e.g., by assigning a score of zero to the entry 336 associated with "Cheeseburger in Paradise (776111)."

Information associated with relevant entries of the media consumption history database, e.g., information associated with the identified entries and the relevance scores assigned to the entries, can be transmitted to the query engine 320, and the query engine 320 can determine relevant information to provide for output in response to the search query. For instance, the query analysis engine 344 can transmit information to the query engine 320 that identifies the content items associated with the entries 332, 334 of the media consumption history database, information associated with the entries 332, 334, and relevance scores assigned to the entries 332, 334. In some implementations, information associated with all of the entries 332, 334, 336 of the media consumption history database and relevance scores assigned to those entries can be transmitted to the query engine 320.

Based on the received information relating to the entries of the media consumption history database and the relevance scores assigned to those entries, the query engine 320 can determine information to output in response to the search query, and can provide a response to the search query to the user. Providing information for output in response to the search query can involve providing information associated with content consumed by the user, e.g., information associated with the entries of the media consumption history database, along with other search query results, e.g., results obtained from the Internet.

In some implementations, the information related to the content consumed by the user can be displayed along with the other search query results, e.g., in the same area of an interface, or can be displayed separately from the other search query results, e.g., in a different area of the interface or at a different interface. For example, the query engine 320 can feature a results field 324 and can provide information for output at the results field 324 that includes both information related to the content consumed by the user that corresponds to the search query and other search query results.

In some implementations, the interface of the query engine 320 can include both a results field 324 and a results panel 326, such that information related to the content consumed by the user is provided for output at the results panel 326 and other results are provided for output at the results field 324. For example, information presented at the results panel 326 can include personal information for the figure "Justin Timberlake," e.g., a profession of "singer/actor" and a birth date of Jan. 31, 1981, as well as information identifying content that the user has consumed that is relevant to the figure "Justin Timberlake," e.g., "The 20/20 Experience" seen at "Radio City Music Hall" on Mar. 3, 2013. In some instances, the information presented at the results panel 326 can be determined based on the relevance scores assigned to the entries of the media consumption history database, e.g., such that the results panel 326 outputs information from one or more of the most relevant entries of the media consumption history database. Thus, information related to the entry 324 corresponding to the content "The 20/20 Experience (101001)" can be provided for output at the results panel 326, while other web results are provided for output at the results field 324.

Figure 4:
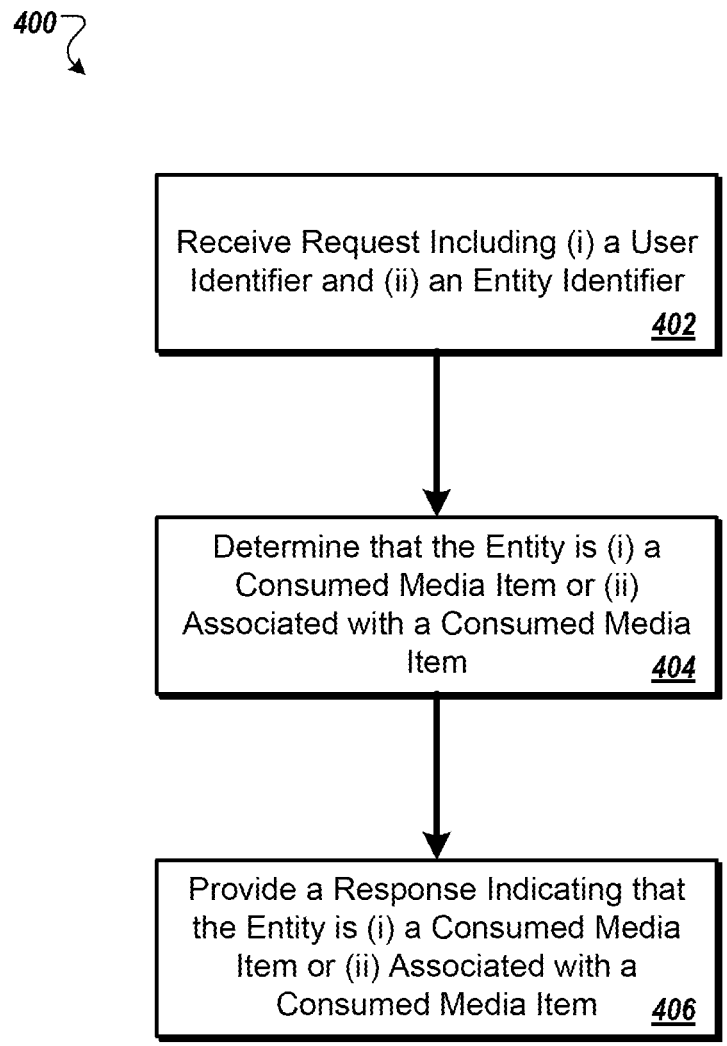
FIG. 4 depicts a flowchart of an example process for responding to requests based on a media consumption history.

FIG. 4 depicts a flowchart of an example process 400 for responding to requests for information based on a media consumption history. For example, the process 400 can be performed by the system 100 in response to a request for information provided by a user. While the process 400 of FIG. 4 is described with respect to responding to a search query input at a search engine, such as the query engine 120, the process 400 is applicable to numerous other applications that utilize a media consumption history, such as the application described with respect to FIGS. 5-7.

At step 402, a request is received that includes a user identifier and an entity identifier. For example, the content consumption engine 130 can receive data that includes data identifying a user and data identifying content and/or an entity associated with content. In some instances, the data that identifies the user can be data that identifies the user that input the request for information. The data identifying the user can be, for example, an IP address, a user account identifier, an email account identifier, or another identifier that identifies a particular user or group of users. In some instances, the data that identifies the entity can be data that identifies a particular entity associated with a content item and/or a content item. As described, data that identifies an entity can be data that identifies a content item or an entity associated with a content item that has been identified from the terms of the request for information, e.g., an entity that has been identified from the terms of a search query input at a search engine. For example, the data received at the content consumption engine 130 can be data that identifies a particular user, e.g., a user that input a search query at a search engine, and can include data identifying a particular entity, e.g., the figure "Justin Timberlake" or the movie "The Social Network."

At step 404, a determination is made as to whether the identified entity is a content item that has been consumed by a user or is an entity that is associated with a content item that has been consumed by a user. For example, based on receiving the information identifying the user and the particular entity, a media consumption history database associated with the content consumption engine 130 can be accessed. Entries of the media consumption history database can be identified that are associated with the user, e.g., that identify content consumed by the user and other information associated with the content and/or the consumption of the content by the user. The entity identified from the request for information can then be compared to the entries of the media consumption history database that are associated with the user to determine whether the identified entity is a content item that has been consumed by the user and/or is an entity that is associated with a content item that has been consumed by the user.

At step 406, based on determining that the identified entity is a content item that has been consumed by the user or is an entity that is associated with a content item that has been consumed by the user, a response is provided that indicates whether the identified entity is a content item that has been consumed by the user or an entity associated with a content item that has been consumed by the user. For example, the content consumption engine 130 can provide a response, e.g., to the query engine 120 or query analysis engine 144, that indicates whether the entity identified from the request for information is a content item that has been consumed by the user or is an entity associated with a content item that has been consumed by the user. In some implementations, as described, the response can include additional information associated with identified content items and/or the user's consumption of identified content items. For example, additional information included with the response may identify times and/or locations where the user consumed the content associated with the entity identified from the search query. Other information may be included with the response, e.g., additional information or different information that is determined based on accessing the media consumption history database associated with the content consumption engine 130.

FIGS. 5-7 depict a particular application that utilizes an established media consumption history to respond to queries that are provided by users of computing devices. Specifically, a user can provide an input at a device, where the input requests information relating to content playing in the environment of the user. For example, the user can provide the voice input, "When have I seen this actor before?" An entity associated with the content playing in the environment of the user can be identified by the system, e.g., an actor referred to by the user's voice input, and based on accessing a media consumption history that identifies content consumed by the user, a response to the user's input can be provided that identifies other content items that the user has consumed and that feature the particular actor.

FIG. 5 illustrates an example process and system 500 for responding to queries based on a media consumption history. The system 500 can be capable of receiving data that includes a user-input query and environmental data obtained from the environment of the user. The environmental data includes at least a segment of a content item playing in the environment of the user, and based on the user-input query and the environmental data, an entity can be identified that is related to the content item. Other content items that relate to or feature the identified entity and that have been indicated as consumed by the user can be identified. A response to the user-input query can be provided that identifies the content items consumed by the user that relate to the identified entity.

Briefly, the system 500 includes an input engine 510, a content recognition engine 520, a query disambiguation engine 540, and a content consumption engine 530. The components of the system 500 can exchange electronic communications over one or more networks such as the network 150, or can exchange communications in another way, such as over one or more wired or wireless connections. As depicted in FIG. 5, the process associated with responding to a query based on a media consumption history can be accomplished by the system 500 according to a three-phase process.

During a first phase of the process for responding to a query, the input engine 510 receives information that includes a user input and environmental data obtained from the environment of a user. For example, a user associated with a client device can provide a query at an interface accessible at the client device, and environmental data can be obtained using one or more components of the client device, such as a microphone and/or camera of the device.

In some instances, an input provided by a user can be a textual input provided by the user, e.g., a query that has been typed by the user at an interface of a client device, can be a voice input provided by the user, e.g., a query that the user has spoken into a microphone of the client device, can be a user selection of a control, e.g., a selection of a button or icon that is associated with providing a query, or can be any other user input that can be detected or received at a client device associated with the user. As described, a client device associated with the user can be any cellular phone, smartphone, tablet computer, laptop computer, desktop computer, mp3 player, wearable computing device, or other device associated with the user.

Environmental data can include ambient audio data obtained from the environment of the user, video data obtained from the environment of the user, image data obtained from the environment of the user, or other environmental data that can be used to identify content items that are playing in the user's environment. For example, a microphone associated with a client device of the user can obtain ambient audio from the environment of the user.

Based on receiving the user input associated with the user-input query and the environmental data, the input engine 510 can transmit the data identifying the user input and the environmental data. For example, as shown in FIG. 5, the input engine 510 can transmit the user input to the query disambiguation engine 540, and can transmit the environmental data to the content recognition engine 520. In some implementations, the input engine 510 transmits the information associated with the user input and the information associated with the environmental data over one or more networks 150, or over one or more other wired or wireless connections.

During a second phase of the process, the query disambiguation engine 540 and content recognition engine 520 can receive information associated with the user input and the environmental data, and can identify an entity based on the user input and the environmental data. In some implementations, the query disambiguation engine 540 can analyze the received user input to identify a particular entity type, e.g., actor or actress, director, writer, musician, singer, producer, production company, etc., and the content recognition engine 520 can identify a particular content item based on the received environmental data. Based at least on the identified identity type and the identified content item, a particular entity can be identified, such as a particular actor or actress, a particular director, etc.

In some implementations, the query disambiguation engine 540 receives data associated with the user input and identifies an entity type based on the user input data. For example, the query disambiguation engine 540 can receive the user input data over one or more networks 150, and can perform analysis of the user input to identify a particular entity type.

In some instances, the user input data encodes a natural language query input by the user, such as a spoken query that the user has provided at a client device. As used in this specification, natural language queries may include any queries that are input by a user using natural language, such as a query input by speaking one or more terms, by typing one or more terms at a client device, or by using a menu of query terms, e.g., a drop-down menu of query terms that the user can select. In the case where the natural language query input by the user is a spoken query, the query disambiguation engine 540 can generate a transcription of the spoken utterance, for example, using automatic speech recognition (ASR), and can analyze the text of the transcription to identify an entity type. For example, a user input can be transcribed by the query disambiguation engine 540 to obtain the transcription, "when have I seen this actor before," and the query disambiguation engine 540 can analyze the text of the transcription to identify an entity type, e.g., an actor or actress entity type.

To determine an entity type from a user input, e.g. a textual user input or a transcription produced from a natural language query input by the user, the query disambiguation engine 540 can compare the terms of the user input to one or more keyword phrases that are associated with entity types. For example, the query disambiguation engine 540 can determine that the term "actor" included in a transcription of a natural language query is associated with an actor or actress entity type, where the actor or actress entity type can be associated with actors or actresses that are featured in video content, such as movies, television shows, news programs, etc. In practice, one or more keyword phrases may be associated with a single entity type. For instance, the terms "actor," "actress," "character," "player," and "movie star" may all be associated with the actor or actress entity type.

In addition to identifying an entity type, the query disambiguation engine 540 can also identify other characteristics of a user-input query. For example, the query disambiguation engine 540 can analyze the terms of a transcription produced from a natural language query input by a user, and can identify a query type associated with the user-input query. Based on obtaining the transcription, "when have I seen this actor before," for example, the query disambiguation engine 540 can identify the terms "when" and/or "before," and can determine that the user is likely requesting information associated with a date or time when the user encountered a particular actor or actress.

The content recognition engine 520 can receive the environmental data obtained from the environment of the user and can identify a content item based on the environmental data. For example, the content recognition engine 520 can receive the environmental data over one or more networks 150, and can perform analysis of the environmental data to identify a particular content item that is playing in the environment of the user.

In some instances, the environmental data is ambient audio data obtained from the environment of the user, and can include the audio of a content item that is playing in the environment of the user. For example, the user can be viewing content that is playing through a television set, and the ambient audio data can include audio from the content that is playing through the television set. The content recognition engine 520 can identify a content item from the environmental data based on, for example, spoken dialogue included in the ambient audio data, vocals of a song that are included in the environment data, instrumentals of a song that are included in the environmental data, sound effects included in the environmental data, based on performing audio fingerprint matching on the environmental data, etc.

Additionally, in some implementations, the content recognition engine 520 can identify a particular segment of the content item that is identified by the environmental data. For example, the environmental data can include audio from a particular segment of a movie, and the content recognition engine 520 can identify the particular segment of the movie, e.g., by identifying a timestamp corresponding to the particular segment of the movie.

The system 500 can identify a queried entity 565 based on the identified entity type and the identified content item. For example, based on the query disambiguation engine 540 identifying an actor or actress entity type and content recognition engine 520 identifying a particular movie, a particular actor can be identified that is featured in the movie. In some implementations, the queried entity 565 can be an entity that corresponds to a particular segment of the identified content item, e.g., an actor that is on-camera during a particular timestamped segment of the movie that has been identified from the environmental data, or can be an entity that is associated with the content item as a whole. For example, identifying a particular actor or actress featured in content can involve identifying a particular actor or actress that is featured in the segment of the content item included in the environmental data, and identifying a particular director or soundtrack associated with the identified content item can involve identifying the particular director or soundtrack that is associated with the entire content item.

In some instances, identifying an entity corresponding to a particular segment of a content item can involve identifying an entity that matches an identified entity type and that is featured in the particular segment of the content item. For example, a timestamped segment of a movie can be identified based on environmental data, where the timestamped segment of the movie is associated with a particular actor or actress. In some implementations, the actor or actress corresponding to a timestamped segment of the movie can be the most predominantly featured actor or actress for the particular segment of the movie, can be an actor or actress that is pictured during the particular segment of the movie, or can be an actor or actress that is speaking during the particular segment of the movie. Alternatively, based on identifying a particular content item and a particular entity type, speaker recognition or other methods can be used to identify a particular entity.

During a third phase of the process for responding to a query, information identifying a particular entity, e.g., the queried entity 565 associated with the identified content item, can be submitted to the content consumption engine 530, and one or more content items that have been consumed by the user and that relate to the queried entity 565 can be identified. For example, based on the query disambiguation engine 540 and/or the content recognition engine 520 identifying the queried entity 565 during the second phase of the process of FIG. 5, information that identifies the queried entity 565 can be submitted to the content consumption engine 530. In some instances, submitting the information identifying the queried entity 565 can involve transmitting the information identifying the queried entity 565 from the content recognition engine 520 or the query disambiguation engine 540 to the content consumption engine 530 over one or more networks 150, or over one or more other wired or wireless connections.

Identifying one or more content items that have been consumed by the user that correspond to the queried entity 565 can involve accessing a media consumption history database associated with the content consumption engine 530. For example, as described, the content consumption engine 530 can maintain a database that includes entries that identify content items that have been indicated as consumed by the user and/or entities associated with content items that have been indicated as consumed by the user. Based on receiving information identifying the queried entity 565, the content consumption engine 530 can identify entries of the media consumption history database that are associated with the queried entity 565. For example, the queried entity 565 may be identified as one or more content items that have been indicated as consumed by the user, e.g., the queried entity 565 may be the title of a movie that the user has previously viewed, or the queried entity 565 can be identified as an entity that is associated with one or more content items that have been indicated as consumed by the user, e.g., the queried entity 565 may be an actor or actress that is featured in a movie that the user has previously viewed.

A response to the query can be provided, based on identifying one or more content items 575 that correspond to the queried entity 565 and that have been identified as having been consumed by the user. In some instances, the response to the query can identify the consumed content items 575, or can provide other information, such as an indication that indicates whether the user has consumed at least one content item that is associated with the queried entity 565. In some instances, providing a response to the query can involve transmitting information over one or more networks 150, e.g., from the content consumption engine 530 to the input engine 510, where the input engine 510 may be capable of providing information for output at a client device associated with a user in addition to receiving user inputs and environmental data. For instance, the content consumption engine 530 can identify one or more content items 575 that the user has consumed that are associated with the queried entity 565, and the content consumption engine 530 can transmit information identifying the one or more consumed content items 575 to the input engine 510 over the network 150. Information identifying and/or pertinent to the one or more consumed content items 575 can be provided for output to the user in response to the query, e.g., based on the input engine 510 providing the information for output at a client device associated with the user.

In implementations described thus far, a user input query is processed based on identifying a particular entity, where the particular entity corresponds to an entity type that is identified from a user input query and is associated with a content item that is identified using environmental data. In some examples, however, the system 500 may process a user input query based only on identifying the content item and determining that the content item is included in the media consumption history database.

For example, while watching a particular movie, a user may provide a user input query, such as the query, "Where have I seen this movie before?" The input engine 510 can receive user input data, such as data encoding the user input, "where have I seen this movie before," and can receive environmental data obtained from the environment of the user. The content recognition engine 520 can identify a content item based on the environmental data. For example, the content recognition engine 520 can identify the particular movie that the user is viewing based on audio data obtained from the environment of the user, where the audio data includes audio of the particular movie. The identified content item can be selected as the queried entity 565, and information identifying the content item, e.g., information identifying the particular movie that the user is viewing, can be submitted to the content consumption engine 530.

The content consumption engine 530 can access the media consumption history database and can determine that the content item is included in the media consumption history database, thereby indicating that the identified content item is a content item that has previously been consumed by the user. The content consumption engine 530 can access information at the media consumption history database that is associated with the content item and/or the consumption of the content item by the user. For example, the content consumption engine 530 can access information that is associated with the user input query, such as information identifying locations where the user has seen a particular movie that they are viewing in response to the user providing the query, "Where have I seen this movie before?" In some implementations, the information associated with the content item and/or the consumption of the content item by the user can be metadata associated with the content item. Based on accessing the information associated with the identified content item at the media consumption history database, a response to the user input query can be provided that includes at least a portion of the accessed information. For example, a response to the user input query can identify other times and/or locations where the user has viewed the particular movie.

In some implementations, information identifying the content item can be submitted to the content consumption engine 530 in addition to or in lieu of information that identifies an entity that has been determined based on an identified entity type and an identified content item. For example, the system 500 can identify a content item based on environmental data, and can additionally or alternatively identify a particular entity based on identifying both the content item and an entity type. Information can be submitted to the content consumption engine 530 identifying only the content item, only the identified entity, or both. Based on the received information, the content consumption engine 530 can, respectively, identify one or more content items that have been consumed by the user and that relate to the identified entity, identify the identified content item at the media consumption history database and access information associated with the identified content item, or both. Based on the information accessed by the content consumption engine 530, a response to the query can be provided that includes information identifying and/or pertinent to the one or more content items consumed by the user that are associated with the identified entity, and/or that includes information associated with the identified content item and/or the consumption of the identified content item by the user.

In some implementations, a response to the user input query can differ based on analysis performed at the content consumption engine 530, where the analysis is performed in response to receiving the submitted information and/or accessing information at the media consumption history database. For example, information submitted to the content consumption engine 530 can identify both the content item identified based on the environmental data and the entity identified based on the identified entity type and the identified content item. Based on receiving the submitted information, the content consumption engine 530 can attempt to identify one or more content items that have been consumed by the user and that relate to the identified entity, and can additionally determine whether the identified content item is identified in the media consumption history database. A response to the query can differ based on whether the content consumption engine 530 identifies one or more content items that have been consumed by the user and that relate to the identified entity and/or based on whether he identified content item is identified in the media consumption history database.

In some instances, if the content consumption engine 530 does not identify one or more content items that have been consumed by the user and that relate to the identified entity, the response to the query may only include information associated with the identified content item. Similarly, if the content consumption engine 530 determines that the identified content item is not identified in the media consumption history database, the response to the query may only identify one or more content items that have been consumed by the user and that relate to the identified entity. If the content consumption engine 530 is able to both identify one or more content items that have been indicated as consumed by the user and that relate to the identified entity and determine that the identified content item is identified in the media consumption history database, the response to the query may identify the one or more content items that have been consumed by the user and that relate to the identified entity, may include at least a portion of the information associated with the identified content item and/or the consumption of the content item by the user, or both.

FIG. 6 depicts a system 600 for responding to queries based on a media consumption database. Specifically, the system 600 addresses an implementation in which a natural language query is provided by a user in the form of a spoken query to request information relating to content that is playing in the environment of the user. In some implementations, the natural language query may be provided in a different form by the user. For example, the natural language query may be a query typed by the user, or may be a query whose terms are selected from a menu of query terms. As used in this specification, the spoken query can be any utterance provided by a voice or voices that the computing system has been instructed and/or designed to accept.

Briefly, the system 600 can identify an entity based on environmental audio data obtained from the environment of a user and an utterance corresponding to a spoken query input by the user. Based on identifying the entity, the system 600 can identify content items that have been indicated as consumed by the user that correspond to the identified entity. The system 600 includes a client device 602, a disambiguation engine front-end 610, a content recognition engine 620, a content consumption engine 630, a speech recognition engine 640, and an entity disambiguation engine 650. The components of the system 600 can each be in communication over one or more networks, such as the network 150, or can be in communication through one or more other wired or wireless connections.

In greater detail, the client device 602 is in communication with the disambiguation engine front-end 610 over one or more networks. The client device 602 can include a microphone, a camera, or other detection mechanisms for detecting utterances associated with spoken queries provided by a user 604 and/or environmental data obtained from the environment of the user 604. In some implementations, the client device 602 can be a mobile computing device, such as a mobile phone, smart phone, personal digital assistant (PDA), music player, e-book reader, tablet computer, laptop computer, or other portable device.

Environmental data, and specifically environmental audio data, includes ambient noise detected by the client device 602, e.g., using a microphone of the client device 602. The disambiguation engine front-end 610 receives waveform data 608 that includes both the utterance associated with the spoken query and the environmental audio data, and processes the waveform data 608 to segment and/or extract the utterance from the waveform data 608. The disambiguation engine front-end 610 provides data corresponding to the spoken query to the speech recognition engine 640 and provides the environmental data to the content recognition engine 620.

The speech recognition engine 640 obtains a transcription of the spoken query, and the entity disambiguation engine 650 identifies a particular entity type associated with the spoken query. Such entity types can include, for example, an actor or actress entity type, a director entity type, a writer entity type, an artist entity type, a movie, television show, live performance, or other entity type identifying types of content, a musician entity type, etc. Using the information identifying the content item and the entity type, a particular entity can be identified. Content items that have been consumed by the user 604 and that correspond to the identified entity can be identified at the content consumption engine 630. Based on identifying the content items that have been consumed by the user 604 and that correspond to the identified entity, a response to the query can be provided to the client device 602 for output to the user 604, e.g., a response that identifies the content items that have been consumed by the user 604 and that are associated with the identified entity.

In some examples, the user 604 is exposed to a particular content item, such as a particular movie or song, and wants to identify other content items that they have consumed and that also feature a particular person or other entity that is featured in the content item. For example, the user 604 may be viewing a movie and may want to know other movies or television shows that they have viewed that feature a particular actor who is in the movie. The user 604 may not know the name of the movie they are viewing or the name of the particular actor, and may therefore say, "Computer, when have I seen this actor before," with the intent that the client device 602 will recognize this phrase as a spoken query to identify other content items that the user 604 has viewed and that feature the particular actor. In some implementations, identifying other content items that the user 604 has viewed that feature the particular actor can include providing a response to the query at the client device 602. The response can be provided for output to the user 604 at the client device 602 and can identify content items that the user 604 has viewed and that feature the particular actor.

The client device 602 detects the utterance constituting the spoken query as well as environmental audio data detected from the environmental of the user 604. In some implementations, the user 604 can select a control to trigger the client device 602 to detect the utterance and the environmental audio data. In other implementations, the detection of utterances and environmental audio data is triggered based on the detection of a hotword, e.g., a triggering keyword, that has been input by the user 604, for example, based on detecting the input of the hotword "Computer" spoken by the user 604.

The environmental audio data obtained from the environment of the user 604 can include ambient noise from the environment of the user 604. For example, the environmental audio data can include the sounds of a movie that is playing concurrently with the spoken utterance, shortly before the spoken utterance, or shortly after the spoken query input by the user 604. In some examples, the environmental audio data associated with the content playing in the environment of the user 604 can include dialogue associated with the content, music associated with the content, sound effects associated with the content, or other audio associated with the content.

In some implementations, the client device 602 detects the environmental audio data after detecting the spoken utterance input by the user 604, e.g., in response to determining that the user 604 is no longer speaking into the client device 602, can be detected concurrently with the spoken utterance, e.g., while the user 604 is speaking into the client device 602, and/or can be detected prior to the client device 602 receiving the spoken utterance, e.g., based on the client device 602 constantly receiving and analyzing audio data received by a microphone of the client device 602.

The client device 602 processes the detected utterance and the environmental audio data to generate waveform data 608 that represents the utterance and environmental audio data. The client device 602 then transmits the waveform data 608 to the disambiguation engine front-end 610 during operation (A). In some examples, the waveform data 608 that includes the utterance input by the user 604 and the environmental audio data is streamed from the client device 602 to the disambiguation engine front-end 610.

The disambiguation engine front-end 610 receives the waveform data 608 from the client device 602. The disambiguation engine front-end 610 processes the waveform data 608 by separating and/or extracting the utterance associated with the spoken query from the waveform data 608, and transmits the data corresponding to the utterance to the speech recognition engine 640 during operation (B). For example, the disambiguation engine front-end 610 can separate the utterance corresponding to the spoken utterance, e.g., "Computer, when have I seen this actor before," from the background noise obtained from the environment of the user 604. In some instances, transmitting the utterance corresponding to the spoken query to the speech recognition engine 640 can include transmitting the data associated with the utterance over one or more networks, or over one or more other wired or wireless connections.

In some implementations, the disambiguation engine front-end 610 utilizes a voice activity detector to facilitate separation and/or extraction of the utterance corresponding to the spoken query from the waveform data 608. The disambiguation engine front-end 610 can use the voice activity detector to identifying a segment of the waveform data 608 that includes voice activity, or voice activity of the user 604 associated with the client device 602, e.g., voice activity that does not correspond to dialogue, lyrics, or other voice activity detected from a content item that is playing in the environment of the user 604. In some examples, the utterance is associated with a spoken query, e.g., a spoken query related to a movie that the user 604 is viewing. In some examples, the waveform data 608 may include only the detected utterance corresponding to the spoken query, and based on the waveform data 608 only including the utterance, the disambiguation engine front-end 610 can request that the client device 602 obtain environmental audio data from the environment of the user 604. In such an implementation, the environmental data is obtained after the spoken query input by the user 604, e.g., may be obtained in response to the user 604 providing the spoken query.

The speech recognition engine 640 receives the portion of the waveform data 608 that corresponds to the utterance (operation (B)). The speech recognition engine 640 obtains a transcription of the utterance and provides the transcription to the entity disambiguation engine 650 during operation (C). Specifically, the speech recognition engine 640 processes the portion of the waveform data 608 that includes the utterance corresponding to the spoken query. In some examples, the speech recognition engine 640 processes the utterance by obtaining a transcription of the utterance. Generating the transcription can include transcribing the utterance into text or text-related data. In other words, the speech recognition engine 640 can provide a representation of language that corresponds to the utterance. For example, the speech recognition engine 640 transcribes the utterance to generate the transcription, "Computer, when have I seen this actor before."

In some instances, a transcription can be modified to remove any hotword terms, based on determining that a transcription includes at least one hotword. For example, based on the term "Computer" being designated as a hotword, when the speech recognition engine 640 generates the transcription of the utterance, "Computer, when have I seen this actor before," the speech recognition engine 640 can remove the term "Computer" from the transcription to obtain the transcription, "when have I seen this actor before." Based on removing one or more hotword terms, the remainder of the processing of the utterance corresponding to the spoken query can then be performed with respect to the transcription, "when have I seen this actor before," in lieu of the unmodified transcription, "Computer, when have I seen this actor before."

The entity disambiguation engine 650 receives the transcription of the utterance associated with the spoken query (operation (C)). In some implementations, as shown in FIG. 6, the entity disambiguation engine 650 receives the transcription of the utterance from the speech recognition engine 640. In other examples, the speech recognition engine 640 generates the transcription of the utterance and transmits data associated with the transcription of the utterance to the disambiguation engine front-end 610, where the disambiguation engine front-end 610 then transmits or relays the data associated with the transcription of the utterance to the entity disambiguation engine 650. The entity disambiguation engine 650 can receive the data associated with the transcription over one or more networks, or one or more other wired or wireless connections. Based on the transcription, the entity disambiguation engine 650 can identify an entity type associated with the spoken query provided by the user 604.

The entity disambiguation engine 650 identifies an entity type associated with the spoken query, based on the text of the transcription that has been obtained from the user-input utterance. In some instances, the entity disambiguation engine 650 identifies the entity type by comparing the text of the transcription to keywords and/or grammars associated with particular entity types. For example, entity types can include such types as actor or actress, director, writer, singer, musician, artist, photographer, editor, band, record label, production company, television network, radio network or station, company, product, song, soundtrack, etc. As described, in some instances, entity types can also include content item types, such as movie, television show, radio broadcast, television commercial, radio commercial, news broadcast, live performance, concert, podcast, etc. Each entity type can be associated with one or more keywords and/or grammars, and based on at least one of the one or more keywords and/or grammars being included in or satisfied by the transcription of the spoken query, the entity disambiguation engine 650 can identify the particular entity type as being referenced by the spoken query.

For example, the entity disambiguation engine 650 receives the transcription of the spoken query from the speech recognition engine 640 and compares the transcription to keywords and/or grammars stored in a keyword database 655. The keyword database 655 can include keywords and/or grammars related to various entity types, including, for example, keywords and/or grammars related to an actor or actress entity type and a singer entity type, as shown in FIG. 6. To identify a particular entity type associated with the spoken query, the entity disambiguation engine 650 can compare the transcription to the keywords and/or grammars associated with each of the entity types.

In some instances, a keyword and/or grammar associated with an entity type can include one or more placeholders within the keyword and/or grammar, such that a transcription does not have to exactly include a particular keyword or exactly match a particular grammar to be identified as pertaining to the particular entity type associated with that keyword and/or grammar. For example, a spoken query can be transcribed as, "who does this song," and the entity disambiguation engine 650 can determine that the transcription "who does this song" matches the grammar "< >This song," where "< >" represents a placeholder, based on the terms "who does" satisfying the placeholder. In some instances, a placeholder may be associated with a specific format that is used to determine the portion of a transcription that is used to replace the placeholder. For example, a format associated with a placeholder may specify that the portion of the transcription replacing the placeholder optionally includes a suffix, e.g., the terms "sings," "singer," and "singing" may all be identified as matching the keyword "sing."

Based on receiving the transcription from the speech recognition engine 640, e.g., the transcription, "when have I seen this actor before," the entity disambiguation engine 650 can access the keyword database 655 and can compare the text of the transcription to the keywords and/or grammars associated with each of the various entity types. For example, the entity disambiguation engine 650 can determine that the transcription, "when have I seen this actor before," corresponds to an actor or actress entity type, based on determining that the term "actor" from the transcription satisfies the keyword "act< >." Based on determining that the transcription, "when have I seen this actor before," corresponds to an actor or actress entity type, the entity disambiguation engine 650 provides data identifying the actor or actress entity type to the disambiguation engine front-end 610 during operation (D).

In some instances, more than one entity type may be associated with a particular keyword and/or grammar pattern. For example, the keyword "< >Play< >" may be a keyword associated with a band entity type, a musician entity type, and an actor or actress entity type. In such instances, the entity disambiguation engine 650 may provide data identifying the multiple entity types to the disambiguation engine front-end 610, e.g., by providing data that indicates that the spoken query is likely associated with one of a band entity, musician entity, or actor or actress entity. Alternatively, the entity disambiguation engine 650 can identify a single entity type from among the multiple identified entity types, or can identify a subset of the multiple entity types, based on the entity disambiguation engine 650 performing additional analysis of the transcription of the utterance.

In some implementations, based on the transcription of the utterance matching more than one entity type, the data provided by the entity disambiguation engine 650 to the disambiguation engine front-end 610 at operation (D) can identify all of the matched entity types. In other implementations, additional analysis is performed at the entity disambiguation engine 650 to identify a subset of entity types from among the matched entity types, and the data provided to the disambiguation engine front-end 610 at operation (D) can identify the subset of entity types. For instance, a transcription of a spoken query can be identified as matching two of the keywords and/or grammars associated with the actor or actress entity type, and only one of the keywords and/or grammar patterns associated with each of the band entity type and musician entity type. Based on the transcription satisfying more keywords and/or grammars associated with the actor or actress entity type than any other entity type, the data provided to the disambiguation engine front-end 610 by the entity disambiguation engine 650 may identify only the actor or actress entity type. In some implementations, other methods may be used to identify a particular entity type from amongst multiple potential entity types.

In some implementations of the described subject matter, the entity disambiguation engine 650 can additionally or alternatively identify one or more content item types based on the transcription of the spoken utterance. Content item types may be identified as associated with particular entity types, e.g., an identified entity type may be associated with one or more particular content item types, or may be identified independently from the entity type, e.g., based on a separate analysis of a transcription of the spoken query.

For example, an actor or actress entity type may be identified as being associated with content items matching a movie content type, television show content type, and television commercial content type. The content item types associated with the various entity types may be identified by the entity disambiguation engine 650 by accessing the keyword database 655, e.g., such that the keyword database 655 identifies one or more content item types associated with each of the entity types. In some instances, providing data to the disambiguation engine front-end 610 that identifies an entity type corresponding to a spoken query can further include identifying the one or more content item types that are associated with the identified entity type.

In some instances, content item types may be associated with keywords and/or grammars, such as keywords or grammars stored at the keyword database 655, and a content item type can be identified based on the transcription of the spoken query by using similar techniques as those used to identify an entity type. For example, a spoken query may be transcribed as, "when have I seen this movie star before," and based on the transcription including the keyword "movie" that is associated with a movie content item type, the entity disambiguation engine 650 may provide data to the disambiguation engine front-end 610 identifying the movie content item type.

Particular content item types may be associated with particular entity types and/or may exclude particular entity types. For example, an album content item type may be associated with an artist entity type, but may exclude being associated with an actor or actress entity type.

In some implementations, the entity disambiguation engine 650 can additionally identify one or more query types based on the transcription of the spoken query. For example, the entity disambiguation engine 650 can identify a query type associated with the spoken query by comparing the text of a transcription to keywords and/or grammars associated with particular query types. For example, a query type can be associated with a query requesting locations, e.g., locations where the user 604 has been exposed to a particular entity or content item, can be associated with a query requesting times or dates, e.g., times or dates when the user 604 was exposed to a particular entity or content item, can be associated with a query that requests how a user consumed content, e.g., whether the user 604 viewed a particular movie at a movie theatre or at home using a movie rental service, can be associated with a query requesting information associated with a particular entity or content item, e.g., requesting the identity of a particular actor or actress who is featured in a movie or the identity of an entity that is associated with a particular actor or actress, can be associated with a query that requests the system 600 to identify one or more entities and/or content items, e.g., requesting other movies that the user 604 has viewed that feature a particular actor or actress, or can be associated with other query types relating to content and/or entities associated with content. Each query type can be associated with one or more keywords and/or grammars, and based on at least one of the one or more keywords and/or grammars being included in or satisfied by the transcription of the spoken query, the entity disambiguation engine 650 can identify the particular query type as being referenced by the spoken query.

For example, the entity disambiguation engine 650 can compare the transcription to keywords and/or grammars stored at a database accessible to the entity disambiguation engine 650, such as the keyword database 655. The database can include keywords and/or grammars associated with the various query types, such as keywords and/or grammars related to a query type associated with identifying times or dates when a user has been exposed to a particular content item or entity associated with a content item. To identify a particular query type associated with the spoken query, the entity disambiguation engine 650 can compare the transcription of the spoken query to the keywords and/or grammars associated with each of the query types.

In some implementations, and as described with respect to keywords and/or grammars associated with entity types, a transcription of a spoken query may include keywords and/or grammars that match more than one query type. In response to identifying more than one query type based on a transcription of a spoken query, the entity disambiguation engine 650 may identify all of the matching query types, or may perform additional analysis to determine a subset of the identified query types. The entity disambiguation engine 650 can provide information to the disambiguation engine front-end 610 identifying the one or more identified query types.

In some instances, particular query types may be associated with or exclude particular content item types and/or particular entity types. For example, a query type associated with queries that request locations or times may not be associated with a podcast content type or a television station entity type, but may be associated with a movie content type or an actor content type.

Based on identifying one or more query types associated with the voice query, information can be provided by the entity disambiguation engine 650 to the disambiguation engine front-end 610 that identifies the one or more query types. In instances in which more than one query type is identified, e.g., based on the transcription of the utterance matching more than one of the query types, the entity disambiguation engine 650 may provide information identifying all of the one or more query types or identifying a subset of the one or more query types. For example, the entity disambiguation engine 650 may perform additional analysis of the transcription of the utterance to identify a single query type from among the one or more identified query types and may provide information identifying the single query type to the disambiguation engine front-end 610.

The disambiguation engine front-end 610 receives the data identifying the entity type, and optionally the content item type and/or query type, from the entity disambiguation engine 650 at operation (D). For example, the disambiguation engine front-end 610 can receive the information identifying an entity type associated with the user-input utterance from the entity disambiguation engine 650 over one or more networks.

The disambiguation engine front-end 610 provides the environmental audio data to the content recognition engine 620 during operation (E). In some implementations, the disambiguation engine front-end 610 transmits the portion of the waveform data 608 corresponding to the environmental audio data to the content recognition engine 620 over one or more networks. The portion of the waveform data 608 corresponding to the environmental audio data can include, for example, audio from a movie that is playing in the environment of the user 604, e.g., a segment of dialogue from the movie, music from the movie, or other sounds from the movie that are included in the environmental audio data obtained by the client device 602.

The content recognition engine 620 receives the environmental audio data from the disambiguation engine front-end 610. The content recognition engine 620 identifies one or more content items based on the environmental audio data, and provides data identifying the one or more content items to the disambiguation engine front-end 610 during operation (F). Specifically, the content recognition engine 620 processes the environmental audio data to identify one or more content items that are included in environmental audio data. For example, the content recognition engine 620 can identify one or more content items based on a segment of dialogue that is included in the environmental data, based on a segment of a soundtrack or other music that is included in the environmental data, based on sound effects that are included in the environmental data, or based on other audio data that is included in the environmental data.

In some examples, a single content item may be identified based on processing the environmental audio data. For example, environmental audio data may include dialogue from a particular movie, and the content recognition engine 620 may identify the particular movie based on the environmental audio data. In other examples, more than one content item may be identified based on the environmental audio data. For example, environmental audio data may include a segment of a soundtrack from a particular movie, and the content recognition engine 620 may identify the movie, the soundtrack, and the particular song from the soundtrack that is included in the environmental data as content items associated with the environmental audio data. Based on identifying the movie, the soundtrack, and the particular song, the content recognition engine 620 may provide information to the disambiguation engine front-end 610 identifying the movie, soundtrack, and particular song.

In some implementations, the disambiguation engine front-end 610 can provide information identifying one or more entity types and/or content item types to the content recognition engine 620, in addition to providing the content recognition engine 620 with the environmental audio data. For example, the disambiguation engine front-end 610 can provide the content recognition engine 620 with environmental audio data obtained from the waveform data 608, and can further provide the content recognition engine 620 with information identifying an actor or actress entity type and/or a movie content item type.

Based on identifying more than one content item that corresponds to the environmental audio data, the content recognition engine 620 can provide information to the disambiguation engine front-end 610 that identifies only those content items that correspond to the environmental audio data and that are content items corresponding to the specified content item type and/or that feature entities corresponding to the specified entity type. For example, the content recognition engine 620 can identify a movie, a soundtrack, and a particular song, e.g., a particular song from the identified soundtrack. Based on receiving information identifying an actor or actress entity type and/or a movie content item type, the content recognition engine 620 may determine to provide information to the disambiguation engine front-end 610 that identifies the movie and that does not identify the soundtrack and song. In another example, based on identifying a movie, a soundtrack, and a particular song corresponding to environmental audio data, and additionally based on receiving an indication identifying a musician entity type, the content recognition engine 620 may provide information to the disambiguation engine front-end 610 that identifies both the soundtrack and the particular song. While this example describes the content recognition engine 620 receiving the indication of the entity types and/or content item types from the disambiguation engine front-end 610, in other implementations, the content recognition engine 620 may receive the indication of the entity types and/or content item types from the entity disambiguation engine 650 or from another component of the system 600.

In some instances, content items can be identified by the content recognition engine 620 and the content recognition engine 620 can provide additional content item data relating to the identified content items to the disambiguation engine front-end 610. Additional content item data can identify a name of a content item, one or more entities associated with the content item, e.g., one or more actors, directors, artists, production companies, etc., an international standard recording code (ISRC) associated with the content item, a track, episode, or chapter identifier identifying a particular segment of a content item, or other information identifying a content item or segment of a content item. In some implementations, the content recognition engine 620 transmits the information identifying the content item and the additional content item data to the disambiguation engine front-end 610 over one or more networks, such as the network 150, or over one or more other wired or wireless connections.

In some implementations, the content recognition engine 620 is an audio fingerprinting engine that utilizes content fingerprinting using wavelets to identify the content items. Specifically, the content recognition engine 620 converts the portion of the waveform data 608 corresponding to the environmental audio data into a spectrogram. From the spectrogram, the content recognition engine 620 extracts spectral images. The spectral images can be represented as wavelets. For each of the spectral images that are extracted from the spectrogram, the content recognition engine 620 extracts the "top" wavelets based on the respective magnitude of the wavelets. For each spectral image, the content recognition engine 620 computes a wavelet signature of the image. In some examples, the wavelet signature is a truncated, quantized version of the wavelet decomposition of the image.

For example, to describe an m×n image with wavelets, m×n wavelets are returned without compression. Additionally, the content recognition engine 620 utilizes a subset of the wavelets that most characterize the content item. Specifically, the t "top" wavelets (by magnitude) are selected, where t<<m×n. Furthermore, the content recognition engine 620 creates a compact representation of the sparse wavelet-vector described above, for example, using MinHash to compute sub-fingerprints for these sparse bit vectors.

In addition to determining the identity of a content item, the content recognition engine 620 can, in some implementations, identify a timestamp associated with a particular segment of the content item. An identified timestamp can correspond to a particular segment of a content item that is included in the environmental audio data. In some examples, a timestamp can be a counter value, e.g., an indication of a particular point in time of a movie or song.

In some implementations, a timestamp can be an alphanumeric code that uniquely identifies a particular segment of a particular content item. For example, the content recognition engine 620 can determine that a particular segment of dialogue of a movie corresponds to a particular segment of the movie, and can identify a particular alphanumeric timestamp in response to determining that the segment of dialogue corresponds to the particular segment of the movie. In such an embodiment, the alphanumeric code can be unique to both the segment of the content item and the content item, e.g., such that no segment of any content item is associated with the same alphanumeric code as any other segment of any other content item.

In other implementations, a timestamp used to identify a particular segment of a particular content item can be a representation of a time counter, where the timestamp is not unique to the particular content item. For example, a particular timestamp can be identified based on determining that a segment of dialogue of a first movie occurs at a particular time in the first movie, and the same timestamp can be identified based on determining that another sample of environmental audio data corresponds to the same time in a second movie. The data identifying the content item can then be used to determine that the particular timestamp corresponds to the segment of dialogue of the first movie, and not the time in the second movie corresponding to the timestamp.

In some embodiments, identifying a content item and a corresponding timestamp can be achieved by comparing the environmental audio data to audio data of content items stored in a prerecorded content item database (not shown). For example, the content recognition engine 620 may be associated with a database that contains a corpus of prerecorded content items that have been preprocessed and assigned timestamps, and the content recognition engine 620 can recognize a content item and a timestamp corresponding to a segment of the content item by comparing the environmental audio data to the content items in the prerecorded content item database.

In some implementations, a prerecorded content item database includes preprocessed versions of various content items, e.g., preprocessed versions of a multitude of movies, television shows, news broadcasts, sporting events, radio broadcasts, radio and television commercials, etc. Content items and metadata associated with the content items can be preprocessed in bulk and the processed content data can be stored in a prerecorded content item database. In some implementations, the processed data can include audio fingerprints of the content items, where the audio fingerprints can be indexed and used to recognize a content item from environmental audio data by matching the audio fingerprints of the environmental audio data to the audio fingerprints of a particular content item. In some embodiments, the processed content item data also includes timestamps corresponding to segments of the various content items, and identifying a timestamp based on environmental audio data can involve determining that the environmental audio data corresponds to a particular timestamped segment of the content item. For example, timestamped segments of a content item can be associated with particular audio fingerprints, and identifying a timestamp of the content item that corresponds to the environmental audio data can involve matching audio fingerprints of the environmental audio data to audio fingerprints of the content item and identifying the timestamp of the content item that corresponds to the matched audio fingerprints.

In some instances, a timestamp that is identified based on the environmental audio data can be the timestamp corresponding to the segment of the recognized content that is included in the environmental audio data. For example, the environmental audio data can include audio from a particular segment of a movie, and the identified timestamp can be the timestamp that corresponds to that particular segment of the movie.

In other instances, the timestamp of a content item that is identified based on the environmental audio data can be a timestamp that is associated with a different segment of the content item than what is included in the environmental audio data. For example, environmental audio data received at the content recognition engine 620 can include audio of a particular segment of a movie, and the timestamp identified based on the received environmental audio data can be a timestamp corresponding to a segment of the movie that occurs shortly before the segment of the movie included in the environmental audio data. In some implementations, the identified timestamp can be a timestamp associated with a segment of an identified content item that occurs prior to, concurrent with, or after the segment of the content item that is included in the environmental audio data. In some instances, identifying a timestamp corresponding to a segment of a content item that occurs before the segment of the content item included in the environmental audio data can enable the system 600 to better address the intent of the user 604. For example, based on the user 604 likely requiring additional time to enter a spoken query after determining that they would like to provide the query, a timestamp can be identified that corresponds to a segment of an identified content item that slightly precedes the segment of the content item included in the environmental audio data.

In some implementations, one or more entities associated with a content item identified by the content recognition engine 620 and/or a particular timestamped segment of a content item identified by the content recognition engine 620 can be identified. For example, based on identifying a particular timestamped segment of a movie, an actor or actress associated with the timestamped segment can be identified, e.g., the actor or actress that appears the most during the timestamped segment of the movie. Some entities may be associated with all of the timestamped segments of a content item, e.g., a director of a movie may be associated with all of the timestamped segments of the movie. Identifying one or more entities associated with a content item or timestamped segments of a content item may involve accessing information that identifies entities associated with content items at a database that is accessible by the content recognition engine 620. For example, the prerecorded content item database may store information identifying entities associated with content items and/or particular segments of content items, and identifying one or more entities associated with an identified content item or a particular timestamped segment of an identified content item can include identifying one or more entities associated with the identified content item and/or the particular timestamped segment of the identified content item at the prerecorded content item database.

In some instances, based on the disambiguation engine front-end 610 providing information identifying an entity type to the content recognition engine 620, the content recognition engine 620 can identify one or more entities corresponding to the identified entity type that are associated with an identified content item. For example, the content recognition engine 620 can receive information identifying an actor or actress entity type, and based on identifying a particular segment of a movie that corresponds to received environmental audio data, the content recognition engine 620 can identify an actor or actress associated with the particular segment of the movie. The content recognition engine 620 can then provide information to the disambiguation engine front-end 610 that identifies the particular entity corresponding to the identified entity type. For example, the content recognition engine 620 can transmit data to the disambiguation engine front-end 610 that identifies the particular actor or actress associated with the particular segment of the movie.

The content recognition engine 620 can provide information identifying the one or more content items, and optionally the one or more timestamps and/or entities, to the disambiguation engine front-end 610 (operation (F)). In some implementations, the disambiguation engine front-end 610 can receive the information identifying the one or more content items, timestamps, and/or entities over one or more networks 150, or over one or more other wired or wireless connections. Based on receiving the information identifying an entity type, e.g. from the entity disambiguation engine 650, and the information identifying one or more content items, e.g., from the content recognition engine 620, the disambiguation engine front-end 610 can identify a particular entity.

Identifying a particular entity can involve identifying an entity that is associated with a particular content item identified by the content recognition engine 620 and that matches the entity type identified by the entity disambiguation engine 650. For example, the disambiguation engine front-end 610 can receive information identifying a particular movie, e.g., the movie "World War Z" that has been identified based on the environmental audio data, and information identifying a director entity type, and the disambiguation engine front-end 610 can identify, as the entity, the director of the movie, e.g., the director of the movie "World War Z," Marc Forster.

In some instances, more than one entity may correspond to a particular entity type for an identified content item. For example, the disambiguation engine front-end 610 can receive information identifying a particular movie, e.g., the movie "World War Z," and information identifying an actor or actress entity type. Since the movie likely features more than one entity matching the actor or actress entity type, e.g., the movie "World War Z" features the actors "Brad Pitt," "Mireille Enos," "Daniella Kertesz," etc., the disambiguation engine front-end 610 may select a single entity from among the multiple entities matching the identified entity type, e.g., may select the actor "Brad Pitt" as the entity. In some implementations, the disambiguation engine front-end 610 can select the entity that appears most frequently or that is the most predominantly featured entity in the identified content item that matches the selected entity type, may select the entity that appears first in the identified content item from among the entities that match the entity type, or may use another metric or evaluation to select a single entity from among the multiple entities that match the selected entity type and that are associated with the particular content item.

As discussed, in some implementations, the disambiguation engine front-end 610 can receive information identifying a content item and a timestamp associated with the content item from the content recognition engine 620, and can receive information identifying an entity type from the entity disambiguation engine 650. The disambiguation engine front-end 610 can identify an entity based on the identified content item, the timestamp, and the entity type. For example, the disambiguation engine front-end 610 can receive information identifying a movie, e.g., the movie "World War Z," a timestamp corresponding to a particular segment of the movie, e.g., a timestamp identifying a particular segment of the movie "World War Z," and an actor or actress entity type, and can identify a particular entity based on the information identifying the movie, the timestamp, and the actor or actress entity type, e.g., can identify "Brad Pitt" as the entity, based on the actor "Brad Pitt" being featured in the segment of the movie "World War Z" identified by the timestamp.

In some instances, the disambiguation engine front-end 610 can receive information identifying more than one content item and information identifying an entity type. For example, the disambiguation engine front-end 610 can receive information identifying a movie, a soundtrack, and a song, e.g., a song that is included in the soundtrack, as well as information identifying an entity type, e.g., an actor or actress entity type or a band entity type. In some implementations, the disambiguation engine front-end 610 can identify content item types that correspond to the selected entity type, and can select a single content item from among the multiple content items, where the selected content item matches one of the identified content item types. For example, the disambiguation engine front-end 610 can determine that the actor or actress entity type is associated with a movie content item type, a television show content item type, and a television commercial content item type. The disambiguation engine front-end 610 can select the movie content item from among the movie, soundtrack, and song content items, based on the movie content item being the only content item associated with a content item type that matches one of the content item types associated with the actor or actress entity type. Similarly, the disambiguation engine front-end 610 can determine that the band entity type is associated with a song content item type, an album content item type, and a soundtrack content item type. The disambiguation engine front-end 610 can select either the song or the soundtrack content items from among the movie, soundtrack, or song content items, based on the song and soundtrack content items both matching a content item type associated with the selected entity type.

Based on identifying a movie as the content item, e.g., in response to the entity type being an actor or actress entity type, the disambiguation engine front-end 610 can select an entity associated with the movie that satisfies the actor or actress entity type, e.g., the actor or actress that appears first in the movie, the most predominantly featured actor or actress in the movie, etc. Based on identifying a song or soundtrack content item, e.g., in response to the entity type being a band entity type, the disambiguation engine front-end 610 can select an entity associated with the song or soundtrack that satisfies the band entity type, e.g., the band performing the song, or the band that performs the songs of the soundtrack. In instances in which more than one entity may be associated with a content item, e.g., based on more than one band being featured on the soundtrack, the disambiguation engine front-end 610 may select a particular entity from among the entities, e.g., by determining the band that is the first band featured on the soundtrack, by determining the band that is the most predominantly featured band on the soundtrack, etc.

In some instances, the disambiguation engine front-end 610 can receive information identifying more than one content item, timestamps corresponding to particular segments of each of the content items, and information identifying an entity type. For example, the disambiguation engine front-end 610 can receive information identifying a movie, a soundtrack, and a song, information identifying particular segments of each of the movie, soundtrack, and song, and information identifying an entity type, e.g., an actor or actress entity type. The disambiguation engine front-end 610 can select content item types associated with the particular entity type, and can select a single content item from among the multiple content items that matches one of the identified content item types, as described. For example, based on the identified entity type being an actor or actress entity type, the disambiguation engine front-end 610 can select the movie as the identified content item. As described, the disambiguation engine front-end 610 can then select a particular entity associated with the movie that matches the identified entity type and that is associated with the particular segment of the movie that corresponds to the timestamp, e.g., a particular actor or actress featured in the movie that is associated with the segment of the movie corresponding to the timestamp.

In some instances, the disambiguation engine front-end 610 can receive information identifying more than one entity type, in addition to information identifying one or more content items. Optionally, the disambiguation engine front-end 610 can also receive information identifying timestamps corresponding to segments of the one or more content items. Based on receiving the information identifying more than one entity type, the disambiguation engine front-end 610 can select a single entity type from among the identified entity types. For example, the disambiguation engine front-end 610 can receive information identifying a band entity type, musician entity type, and actor or actress entity type, and can select a single entity type from among the band, musician, and actor or actress entity types. The disambiguation engine front-end 610 can also select a content item from among the one or more content items identified by the content recognition engine 620, as described. The disambiguation engine front-end 610 can then select a particular entity corresponding to the selected entity type, where the particular entity is featured in the particular selected content item, e.g., an entity corresponding to the selected entity type that is featured in the selected content item and that is associated with the timestamped segment of the selected content item.

Selecting a particular entity type from among multiple identified entity types can include requesting additional input from the user 604 to identify a particular entity type. For example, based on receiving information identifying a band entity type, a musician entity type, and an actor or actress entity type, the disambiguation engine front-end 610 can provide a request for information that can be output at the client device 602 associated with the user 604. The request for information can ask that the user 604 select an intended entity type from among the identified entity types, e.g., that the user 604 select one of the band entity type, musician entity type, or actor or actress entity type. The disambiguation engine front-end 610 can receive the information indicating the selection of the user 604, and can select the entity type indicated by the user 604 from among the identified entity types.

In some instances, a particular entity type can be selected from among multiple identified entity types by comparing the multiple identified entity types to an identified content item type, and selecting an entity type that corresponds to the content item type. For example, the disambiguation engine front-end 610 can receive information identifying a band entity type, a musician entity type, and an actor or actress entity type, and can receive information identifying a movie, e.g., a movie content item type. Based on determining that only the actor or actress entity type corresponds to the movie content item type, the disambiguation engine front-end 610 can select the actor or actress entity type from among the identified entity types. In other implementations, different or additional analyses can be performed to select an entity type from among multiple identified entity types. The different or additional analyses can select the entity type based on the information identifying the multiple identified entity types, information identifying one or more content item types, and/or other received information. Once a single entity type has been selected and a single content item has been selected, the disambiguation engine front-end 610 can select an entity that is featured in the identified content item and that matches the identified entity type.

In some instances, the disambiguation engine front-end 610 can receive information identifying a content item type, in addition to receiving information identifying one or more identified content items and one or more identified entity types. The information identifying the content item type can be used to select a particular content item from among the content items, in instances in which more than one content item has been identified. For example, the disambiguation engine front-end 610 can receive information identifying a movie content item, a soundtrack content item, and a song content item, and can additionally receive information identifying a movie content item type. Based on receiving the information identifying the movie content item type, the movie content item can be selected from among the identified content items, as the content item associated with the user-input query.

Similarly, the disambiguation engine front-end 610 can receive information identifying more than one entity type and information identifying a content item type, and the disambiguation engine front-end 610 can select a particular entity type from among the multiple identified entity types, based on the identified content item type. For example, the disambiguation engine front-end 610 can receive information identifying a band entity type, a musician entity type, and an actor or actress entity type, and based on receiving information identifying a movie content item type, the disambiguation engine front-end 610 can select the actor or actress entity type as the entity type associated with the spoken query provided by the user 604.

In some instances, information identifying more than one content item type may be received at the disambiguation engine front-end 610, and a particular content item and/or entity type may be selected from among one or more identified content items and/or entity types, based on the multiple identified content item types. For example, identified content items that do not match one of the identified content item types may be excluded from consideration when selecting a particular content item from among multiple identified content items. Similarly, identified entity types that do not correspond to one of the identified content item types may be excluded from consideration when selecting a particular entity type from among multiple identified entity types. Additional analysis may be performed on the information identifying the one or more content items, one or more entity types, and one or more content item types to select a particular entity associated with the spoken query input by the user 604. Additionally, in some instances, information identifying one or more query types may be received at the disambiguation engine front-end 610, and the disambiguation engine front-end 610 can use the information identifying the one or more query types, the information identifying one or more content items, the information identifying one or more entity types, and/or information identifying one or more content item types to select an entity associated with the user-input query.

In some implementations, one or more confidence scores can be generated and used to select an entity. For example, based on the disambiguation engine front-end 610 receiving information identifying one or more content items, one or more entity types, one or more content item types, and/or one or more query types, a confidence score can be determined for the content items and/or entity types that can be used to identify a particular content item and/or entity type. Identifying a particular content item and/or entity type can involve selecting a particular content item and/or entity type that are associated with the highest confidence scores, or confidence scores that otherwise indicates the greatest confidence for the content item and/or entity type being the content item and/or entity type referred to by the query provided by the user 604. An entity can then be selected that is associated with the selected content item and that matches the selected entity type, as described.

In some instances, the disambiguation engine front-end 610 can access information identifying entities associated with content items, information indicating a content item type associated with a content item, content item types associated with an entity type, and/or other information at one or more databases or other data sources accessible to the disambiguation engine front-end 610. For example, the disambiguation engine front-end 610 can access information identifying entities associated with a content item at a prerecorded content item database associated with the content recognition engine 620. The disambiguation engine front-end 610 can similarly access information identifying a content item type associated with a content item at the prerecorded content item database, and can access information identifying content item types associated with an entity type by communicating with the entity disambiguation engine 650.

The disambiguation engine front-end 610 can select an entity and can transmit information identifying the entity to the content consumption engine 630 at step (G). For example, the disambiguation engine front-end 610 can transmit data identifying the selected entity to the content consumption engine 630 over one or more networks, such as the network 150, or one or more other wired or wireless connections, and the content consumption engine 630 can receive the data identifying the selected entity. In some implementations, data identifying a selected entity can be data that identifies a name of the selected entity, e.g., a name of the actor "Brad Pitt," can be data identifying a code associated with the selected entity, e.g., an alphanumeric code "501501" associated with the actor "Brad Pitt," or can be any other data that identifies the entity selected by the disambiguation engine front-end 610.

Based on receiving the information identifying the selected entity, the content consumption engine 630 selects one or more content items that have been indicated as consumed by the user 604 and that feature or are otherwise associated with the selected entity. For example, the content consumption engine 630 can receive information identifying the actor "Brad Pitt," and the content consumption engine 630 can select one or more content items that that have been indicated as consumed by the user 604 and that feature the actor "Brad Pitt" by accessing a content database 635 that identifies content items that have been indicated as consumed by the user 604. For instance, the content consumption engine 630 can access the content database 635 and can determine that the user 604 has also consumed the content items "Moneyball," associated with the alphanumeric code "500500," and "Ocean's Eleven," associated with the alphanumeric code "605506" that both feature the actor "Brad Pitt," and the content consumption engine 630 can select the content items "Moneyball" and "Ocean's Eleven." The content consumption engine 630 can select the one or more content items that have been consumed by the user 604 and that feature the selected entity using the techniques described with respect to FIGS. 1-3.

In some implementations, in addition to selecting content items that have been indicated as consumed by the user 604 and that are associated with or feature the selected entity, the content consumption engine 630 can access additional information associated with the selected content items and/or the consumption of the selected content items by the user 604. For example, as described, the content consumption engine 630 can identify entities associated with the selected content items, can access summaries of the selected content items, or can access other information associated with the selected content items. The content consumption engine 630 can also identify information associated with the consumption of the selected content items by the user 604, such as locations where the user 604 consumed the selected content items, times and dates when the user 604 consumed the selected content items, information indicating how the user 604 consumed the selected content items, or information indicating how the system 600 determined that the user 604 consumed the selected content items.

In some implementations, the content consumption engine 630 can receive information identifying a query type associated with the user-input query, in addition to the information identifying the selected entity, and the content consumption engine 630 may only access information corresponding to the identified query type that is associated with selected content items that have been indicated as consumed by the user 604 and that feature or are otherwise associated with the selected entity. For example, the content consumption engine 630 can receive information identifying the actor "Brad Pitt" and information indicating that the query input by the user 604 was a query requesting times and dates when the user 604 has previously seen the actor "Brad Pitt." In response to receiving the information identifying the query as a request for times and dates when the user 604 has previously seen the actor "Brad Pitt," the content recognition engine 620 may only access information indicating times and dates when the user 604 consumed the movies "Moneyball" and "Ocean's Eleven," both of which feature the actor "Brad Pitt."

The content consumption engine 630 can select one or more content items that have been indicated as consumed by the user 604 and that feature or are otherwise associated with the selected entity, and can provide information identifying the one or more selected content items to the disambiguation engine front-end 610 during operation (H). In addition, in some instances, the content consumption engine 630 can access additional information associated with the selected content items or the consumption of the selected content items by the user 604, and can transmit the additional information to the disambiguation engine front-end 610. For example, in response to receiving information identifying the actor "Brad Pitt," the content consumption engine 630 can select the content items "Moneyball" and "Ocean's Eleven" that have been consumed by the user 604 and that feature "Brad Pitt," as well as additional information associated with the content items "Moneyball" and "Ocean's Eleven" and/or the consumption of the content items "Moneyball" and "Ocean's Eleven" by the user 604. The content consumption engine 630 can then transmit the information identifying the selected content items "Moneyball' and "Ocean's Eleven" and the additional information to the disambiguation engine front-end 610 over one or more networks, or over one or more other wired or wireless connections.

The disambiguation engine front-end 610 can receive the information identifying the selected content items that have been indicated as consumed by the user and that feature or are otherwise associated with the selected entity, as well as the information associated with the selected content items and/or the consumption of the selected content items by the user 604. The disambiguation engine front-end 610 can transmit information identifying the one or more selected content items to the client device 602 at operation (I). Additionally, in some implementations, the disambiguation engine front-end 610 can transmit the additional information associated with the selected content items and/or the consumption of the selected content items by the user 604 to the client device 602. In some implementations, the information can be transmitted by the disambiguation engine front-end 610 to the client device 602 over one or more networks, such as the network 150, or over one or more other wired or wireless connections.

The client device 602 can receive the information identifying the selected content items that have been indicated as consumed by the user 604 and that are associated with or feature the selected entity, and can provide a response to the spoken query to the user 604. For example, the client device 602 can receive the information identifying the content items "Moneyball" and "Ocean's Eleven," and can output information at the client device 602 identifying the content items "Moneyball" and "Ocean's Eleven," in response to the query input by the user 604. In some implementations, the client device 602 can additionally receive information associated with the selected content items and/or the consumption of the selected content items by the user 604, e.g., information associated with the content items "Moneyball" and "Ocean's Eleven" and/or the consumption of the content items "Moneyball" and "Ocean's Eleven" by the user 604.

Based on receiving the information associated with the selected content items and/or the information associated with the consumption of the selected content items by the user 604, the client device 602 can provide the received information, or a subset of the received information, for output to the user 604.

In some implementations, providing information for output to the user 604 in response to the spoken query can involve displaying the information for output to the user 604 at an interface 606 of the client device 602. For example, the interface 606 may display a transcription of the spoken query input by the user 604, e.g., the query, "When have I seen this actor before?" The interface 606 may display information identifying the content item that has been identified as playing in the environment of the user 604 and that has been identified based on the environmental audio data and the spoken query. The interface 606 can also display information identifying the entity that has been selected based on the environmental audio data and the spoken query. For example, the client device 602 may output the message, "You are watching "World War Z" with "Brad Pitt"" at the interface 606. The interface 606 may display the information associated with the selected content items that have been indicated as consumed by the user 604 and that feature or are otherwise associated with the selected entity in response to the spoken query input by the user 604. For example, the interface 606 may display the message, "You have also seen "Brad Pitt" in "Moneyball" and "Ocean's Eleven"" in response to the spoken query input by the user 604. In some instances, the information displayed at the interface 606 in response to the query can include additional information associated with the content items and/or information associated with the consumption of the content items by the user 604, e.g., can include the additional information received from the disambiguation engine front-end 610.

FIG. 7 depicts a flowchart of an example process 700 for responding to query based on a media consumption history. For example, the process 700 can be performed by the system 600 in response to receiving a spoken query input by a user 604.

At step 702, data is received that encodes a natural language query provided by a user and environmental data obtained from the environment of the user. For example, the disambiguation engine front-end 610 can receive data encoding a spoken query provided by the user 604 and environmental audio data obtained from the environment of the user 604. In some implementations, the data encoding the natural language query and the environmental data can be data transmitted to the disambiguation engine front-end 610 by the client device 602. The natural language query and the environmental data obtained from the environment of the user 604 can be obtained, for example, by a microphone associated with the client device 602. The disambiguation engine front-end 610 can receive the data encoding the natural language query and the environmental data over one or more networks, or over one or more other wired or wireless connections.

At step 704, a content item is identified based on the environmental data. For example, the content recognition engine 620 can receive the data encoding the environmental audio data from the disambiguation engine front-end 610, and can identify a content item based on the environmental audio data. The content recognition engine 620 can identify the content item using, for example, audio fingerprinting or other content recognition techniques, and can provide data identifying the content item to the disambiguation engine front-end 610 over one or more networks. In some instances, the content item can be a content item that is playing in the environment of the user 604, e.g., a movie, television show, radio broadcast, etc.

At step 706, an entity type can be determined based on the natural language query. For example, the speech recognition engine 640 can receive the data encoding the natural language query of the user 604 from the disambiguation engine front-end 610, and the speech recognition engine 640 can obtain a transcription of the natural language query. In some implementations, the speech recognition engine 640 can use ASR or other techniques to generate the transcription of the natural language query. The speech recognition engine 640 can provide the transcription of the natural language query to the entity disambiguation engine 650, and the entity disambiguation engine 650 can determine an entity type based on the transcription of the natural language query. The entity disambiguation engine 650 can transmit data identifying the entity type to the disambiguation engine front-end 610 over one or more networks, or one or more wired or wireless connections.

At step 708, an entity is selected that is associated with the identified content item and that matches the determined entity type. For example, the disambiguation engine front-end 610 can receive data identifying the content item from the content recognition engine 620 and can receive data identifying the determined entity type from the entity disambiguation engine 650. Based on the identified content item and the determined entity type, the disambiguation engine front-end 610 selects an entity that is associated with the identified content item and that matches the determined entity type.

At step 710, one or more content items are selected that have been indicated as consumed by the user and that are associated with the selected entity. For example, the disambiguation engine front-end 610 can transmit data that identifies the selected entity to the content consumption engine 630 over one or more networks, or one or more other wired or wireless connections, and the content consumption engine 630 can receive the data identifying the selected entity. Based on receiving the data identifying the selected entity, the content consumption engine 630 can select one or more content items that have been indicated as consumed by the user 604 and that feature or are otherwise associated with the selected entity. The content consumption engine 630 can select the one or more content items, and can transmit data identifying the one or more selected content items to the disambiguation engine front-end 610 over one or more networks, or over one or more other wired or wireless connections.

At step 712, a response can be provided to the natural language query. For example, the disambiguation engine front-end 610 can receive the data identifying the one or more selected content items that have been indicated as consumed by the user 604 and that are associated with the selected entity, and can provide data identifying the one or more selected content items to the client device 602. In some implementations, the disambiguation engine front-end 610 can transmit the data identifying the one or more selected content items to the client device 602 over one or more networks, or over one or more wired or wireless connections. In other examples, the disambiguation engine front-end 610 can receive the information identifying the one or more selected content items, and can provide a response to the natural language query by providing data to the client device 602 that indicates that the user 604 has consumed at least one content item that is associated with the selected entity.

In some implementations, the client device 602 can receive the data associated with responding to the natural language query, and can provide the information associated with responding to the natural language query for output to the user 604. For example, the client device 602 can receive the data identifying the one or more selected content items, and can provide information for output to the user 604 that identifies the one or more selected content items. In another example, the client device 602 can receive the data indicating whether the user 604 has consumed at least one content item that is associated with the selected entity, and can provide information for output to the user 604 that indicates whether the user 604 has consumed at least one content item that is associated with the selected entity. In some implementations, providing information for output to the user 604 in response to the query can involve displaying information responsive to the user-input query at the interface 606 associated with the client device 602.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving (i) a natural language query submitted by a user that requests information relating to a context associated with a prior consumption of a media item, and (ii) ambient environmental data obtained from an environment of a user;
   identifying a particular media item based on detecting a match between one or more features of the ambient environmental data obtained from the environment of the user and one or more features of the particular media item;

determining that the particular media item is identified in a media consumption database that identifies media items that are identified as having been previously consumed by the user;

accessing, at the media consumption database, information that (i) identifies a context associated with the previous consumption of the particular media item by the user, and that is (ii) identified as being responsive to the natural language query submitted by the user; and providing a response to the natural language query submitted by the user that includes at least a portion of the information accessed at the media consumption database that (i) identifies the context associated with the previous consumption of the particular media item by the user, and that is (ii) identified as being responsive to the natural language query submitted by the user.

2. The method of claim 1, further comprising:

selecting a media item type based on the natural language query submitted by the user; and identifying the particular media item based on (i) detecting the match between one or more features of the ambient environmental data obtained from the environment of the user and one or more features of the particular media item, and (ii) determining that the particular media item is associated with a media item type that corresponds to the selected media item type.

3. The method of claim 2, wherein selecting the media item type based on the natural language query submitted by the user comprises:

obtaining a transcription of the natural language query submitted by the user;

comparing the transcription of the natural language query submitted by the user to one or more keyword phrases that are associated with media item types; and selecting the media item type based on determining that the transcription of the natural language query submitted by the user matches a particular keyword phrase that is associated with the selected media item type.

4. The method of claim 1, wherein identifying the particular media item based on detecting the match between one or more features of the ambient environmental data obtained from the environment of the user and one or more features of the particular media item comprises:

obtaining audio fingerprints of the ambient environmental data obtained from the environment of the user;

comparing the audio fingerprints of the ambient environmental data obtained from the environment of the user to audio fingerprints of the particular media item; and determining that the audio fingerprints of the ambient environmental data obtained from the environment of the user match audio fingerprints of the particular media item.

5. The method of claim 1, wherein accessing the information that (i) identifies a context associated with the previous consumption of the particular media item by the user, and that is (ii) identified as being responsive to the natural language query submitted by the user comprises:

obtaining a transcription of the natural language query submitted by the user;

determining, based on comparing the transcription of the natural language query submitted by the user to one or more keyword phrases that are associated with one or more corresponding information types that each relate to a context associated with consumption of a media item by a user, that the transcription of the natural language query submitted by the user matches a particular keyword phrase associated with a particular information type; and accessing, at the media consumption database, the information that (i) identifies characteristics associated with the consumption of the particular media item by the user that correspond to the particular information type.

6. The method of claim 1, wherein accessing the information that (i) identifies a context associated with the previous consumption of the particular media item by the user, and that is (ii) identified as being responsive to the natural language query submitted by the user comprises accessing, at the media consumption database, information that indicates at least one of a location, a time, a date, or a method of consumption of the particular media item by the user.

7. The method of claim 1, wherein the ambient environmental data obtained from the environment of the user is one of ambient audio data obtained from the environment of the user, image data obtained from the environment of the user, or video data obtained from the environment of the user.

8. A system comprising:

one or more computers and one or more storage devices storing instructions that are operable, when executed by the one or more computers, to cause the one or more computers to perform operations comprising:

receiving (i) a natural language query submitted by a user that requests information relating to a context associated with a prior consumption of a media item, and (ii) ambient environmental data obtained from an environment of a user;

identifying a particular media item based on detecting a match between one or more features of the ambient environmental data obtained from the environment of the user and one or more features of the particular media item;

determining that the particular media item is identified in a media consumption database that identifies media items that are identified as having been previously consumed by the user;

accessing, at the media consumption database, information that (i) identifies a context associated with the previous consumption of the particular media item by the user, and that is (ii) identified as being responsive to the natural language query submitted by the user; and providing a response to the natural language query submitted by the user that includes at least a portion of the information accessed at the media consumption database that (i) identifies the context associated with the previous consumption of the particular media item by the user, and that is (ii) identified as being responsive to the natural language query submitted by the user.

9. The system of claim 8, wherein the operations further comprise:

selecting a media item type based on the natural language query submitted by the user; and identifying the particular media item based on (i) detecting the match between one or more features of the ambient environmental data obtained from the environment of the user and one or more features of the particular media item, and (ii) determining that the particular media item is associated with a media item type that corresponds to the selected media item type.

10. The system of claim 9, wherein selecting the media item type based on the natural language query submitted by the user comprises:

obtaining a transcription of the natural language query submitted by the user;

comparing the transcription of the natural language query submitted by the user to one or more keyword phrases that are associated with media item types; and selecting the media item type based on determining that the transcription of the natural language query submitted by the user matches a particular keyword phrase that is associated with the selected media item type.

11. The system of claim 8, wherein identifying the particular media item based on detecting the match between one or more features of the ambient environmental data obtained from the environment of the user and one or more features of the particular media item comprises:

obtaining audio fingerprints of the ambient environmental data obtained from the environment of the user;

comparing the audio fingerprints of the ambient environmental data obtained from the environment of the user to audio fingerprints of the particular media item; and determining that the audio fingerprints of the ambient environmental data obtained from the environment of the user match audio fingerprints of the particular media item.

12. The system of claim 8, wherein accessing the information that (i) identifies a context associated with the previous consumption of the particular media item by the user, and that is (ii) identified as being responsive to the natural language query submitted by the user comprises:

obtaining a transcription of the natural language query submitted by the user;

determining, based on comparing the transcription of the natural language query submitted by the user to one or more keyword phrases that are associated with one or more corresponding information types that each relate to a context associated with consumption of a media item by a user, that the transcription of the natural language query submitted by the user matches a particular keyword phrase associated with a particular information type; and accessing, at the media consumption database, information that (i) identifies characteristics associated with the consumption of the particular media item by the user that correspond to the particular information type.

13. The system of claim 8, wherein accessing the information that (i) identifies a context associated with the previous consumption of the particular media item by the user, and that is (ii) identified as being responsive to the natural language query submitted by the user comprises accessing, at the media consumption database, information that indicates at least one of a location, a time, a date, or a method of consumption of the particular media item by the user.

14. The system of claim 8, wherein the ambient environmental data obtained from the environment of the user is one of ambient audio data obtained from the environment of the user, image data obtained from the environment of the user, or video data obtained from the environment of the user.

15. A computer-readable storage device encoded with a computer program, the program comprising instructions that, if executed by one or more computers, cause the one or more computers to perform operations comprising:

receiving (i) a natural language query submitted by a user that requests information relating to a context associated with a prior consumption of a media item, and (ii) ambient environmental data obtained from an environment of a user;

identifying a particular media item based on detecting a match between one or more features of the ambient environmental data obtained from the environment of the user and one or more features of the particular media item;

determining that the particular media item is identified in a media consumption database that identifies media items that are identified as having been previously consumed by the user;

accessing, at the media consumption database, information that (i) identifies a context associated with the previous consumption of the particular media item by the user, and that is (ii) identified as being responsive to the natural language query submitted by the user; and providing a response to the natural language query submitted by the user that includes at least a portion of the information accessed at the media consumption database that (i) identifies the context associated with the previous consumption of the particular media item by the user, and that is (ii) identified as being responsive to the natural language query submitted by the user.

16. The computer-readable device of claim 15, the operations further comprising:

selecting a media item type based on the natural language query submitted by the user; and identifying the particular media item based on (i) detecting the match between one or more features of the ambient environmental data obtained from the environment of the user and one or more features of the particular media item, and (ii) determining that the particular media item is associated with a media item type that corresponds to the selected media item type.

17. The computer-readable device of claim 16, wherein selecting the media item type based on the natural language query submitted by the user comprises:

obtaining a transcription of the natural language query submitted by the user;

comparing the transcription of the natural language query submitted by the user to one or more keyword phrases that are associated with media item types; and selecting the media item type based on determining that the transcription of the natural language query submitted by the user matches a particular keyword phrase that is associated with the selected media item type.

18. The computer-readable device of claim 15, wherein identifying the particular media item based on detecting the match between one or more features of the ambient environmental data obtained from the environment of the user and one or more features of the particular media item comprises:

obtaining audio fingerprints of the ambient environmental data obtained from the environment of the user;

comparing the audio fingerprints of the ambient environmental data obtained from the environment of the user to audio fingerprints of the particular media item; and determining that the audio fingerprints of the ambient environmental data obtained from the environment of the user match audio fingerprints of the particular media item.

19. The computer-readable device of claim 15, wherein accessing the information that (i) identifies a context associated with the previous consumption of the particular media item by the user, and that is (ii) identified as being responsive to the natural language query submitted by the user comprises:
- obtaining a transcription of the natural language query submitted by the user;
- determining, based on comparing the transcription of the natural language query submitted by the user to one or more keyword phrases that are associated with one or more corresponding information types that each relate to a context associated with consumption of a media item by a user, that the transcription of the natural language query submitted by the user matches a particular keyword phrase associated with a particular information type; and
- accessing, at the media consumption database, the information that (i) identifies characteristics associated with the consumption of the particular media item by the user that correspond to the particular information type.

20. The computer-readable device of claim 15, wherein accessing the information that (i) identifies a context associated with the previous consumption of the particular media item by the user, and that is (ii) identified as being responsive to the natural language query submitted by the user comprises accessing, at the media consumption database, information that indicates at least one of a location, a time, a date, or a method of consumption of the particular media item by the user.

* * * * *